United States Patent
Rehm

(10) Patent No.: US 11,494,799 B1
(45) Date of Patent: Nov. 8, 2022

(54) SUPPORTING ACTION TRACKING AND DEEDS BETWEEN MULTIPLE PARTIES

(71) Applicant: Deedstack, Inc., Boulder, CO (US)

(72) Inventor: William C. Rehm, Boulder, CO (US)

(73) Assignee: William C. Rehm, Boulder, CO (US)

( * ) Notice: Subject to any disclaimer, the term of this patent is extended or adjusted under 35 U.S.C. 154(b) by 39 days.

(21) Appl. No.: 17/321,025

(22) Filed: May 14, 2021

(51) Int. Cl.
*G06Q 30/02* (2012.01)
*G06Q 50/00* (2012.01)
*H04L 9/30* (2006.01)
*H04L 9/06* (2006.01)
*G06Q 40/04* (2012.01)
*G06Q 10/06* (2012.01)
*H04L 67/02* (2022.01)
*G06Q 40/06* (2012.01)
*H04L 9/00* (2022.01)

(52) U.S. Cl.
CPC ........ *G06Q 30/0236* (2013.01); *G06Q 10/06* (2013.01); *G06Q 40/04* (2013.01); *G06Q 40/06* (2013.01); *G06Q 50/01* (2013.01); *H04L 9/0618* (2013.01); *H04L 9/30* (2013.01); *H04L 67/02* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | |
|---|---|---|---|
| 7,321,864 B1* | 1/2008 | Gendler | G06Q 10/063114 705/7.17 |
| 10,185,985 B1* | 1/2019 | Kapila | G06Q 30/0637 |
| 10,861,015 B1* | 12/2020 | Alt | G06Q 20/4014 |
| 10,880,074 B2* | 12/2020 | Revankar | G06Q 20/02 |
| 11,074,530 B1* | 7/2021 | Drucker | G06Q 10/06313 |
| 2001/0032170 A1* | 10/2001 | Sheth | G06Q 10/103 705/26.1 |
| 2005/0087110 A1* | 4/2005 | Kobayashi | G06Q 10/06 111/200 |
| 2005/0228732 A1* | 10/2005 | Slay | G06Q 40/00 705/35 |
| 2009/0070235 A1* | 3/2009 | Mehta | H04L 67/02 705/26.1 |
| 2011/0060612 A1* | 3/2011 | Mercer | G06Q 10/063 715/764 |

(Continued)

*Primary Examiner* — Lashonda Jacobs-Burton
(74) *Attorney, Agent, or Firm* — Holland & Hart LLP

(57) ABSTRACT

Aspects of the disclosure support a server that supports a method for action tracking and deeds between multiple parties using a blockchain. The method may include providing a marketplace for projects, receiving a selection of a project, deploying a smart contract, determining a funding amount is transmitted to the smart contract, and activating a monitoring service. The monitoring service may monitor a data feed of an external system to determine whether a triggering action is performed. The data feed may include data corresponding to actions performed on the external system by a plurality of user identifiers in association with the sponsor. The method may further include causing a funding release action to be executed by the smart contract in accordance with the triggering action being performed, such that at least a portion of the funding amount to the sponsor, a provider for the project, or both.

20 Claims, 10 Drawing Sheets

(56) References Cited

U.S. PATENT DOCUMENTS

| | | | |
|---|---|---|---|
| 2011/0099163 A1* | 4/2011 | Harris | G06Q 10/10 |
| | | | 707/723 |
| 2013/0054484 A1* | 2/2013 | Hoeflinger | G06Q 30/0273 |
| | | | 705/329 |
| 2013/0091047 A1* | 4/2013 | Hough | G06Q 40/04 |
| | | | 705/37 |
| 2013/0132304 A1* | 5/2013 | Sandor | G11C 13/0007 |
| | | | 705/36 R |
| 2013/0226816 A1* | 8/2013 | Chory | G06Q 10/06314 |
| | | | 705/301 |
| 2014/0007038 A1* | 1/2014 | Wong | G06F 8/70 |
| | | | 717/101 |
| 2014/0046719 A1* | 2/2014 | DeTitta | G06Q 30/0273 |
| | | | 705/14.69 |
| 2015/0206202 A1* | 7/2015 | Meadow | G06Q 40/06 |
| | | | 705/36 R |
| 2016/0063543 A1* | 3/2016 | Kernan | G06Q 30/0253 |
| | | | 705/14.51 |
| 2017/0178241 A1* | 6/2017 | Abuelsaad | G06Q 20/36 |
| 2019/0005578 A1* | 1/2019 | Gagne | G06Q 30/018 |
| 2020/0013053 A1* | 1/2020 | Amin | H04L 63/10 |
| 2020/0058055 A1* | 2/2020 | Simha | G06Q 20/3825 |
| 2020/0372501 A1* | 11/2020 | Kadarmandalgi | G06Q 20/065 |
| 2020/0380624 A1* | 12/2020 | Turgman | G06Q 20/02 |
| 2020/0402031 A1* | 12/2020 | Pira | G06Q 20/108 |
| 2020/0402187 A1* | 12/2020 | Yerli | G06T 19/006 |
| 2021/0092121 A1* | 3/2021 | Blais | H04L 63/101 |
| 2021/0166312 A1* | 6/2021 | Dakshi | G06Q 40/04 |
| 2022/0004992 A1* | 1/2022 | Jahr | G06F 8/77 |
| 2022/0044231 A1* | 2/2022 | Tanimoto | G06Q 20/02 |
| 2022/0051235 A1* | 2/2022 | Ohashi | H04L 63/108 |
| 2022/0058614 A1* | 2/2022 | Savanah | G06Q 20/3829 |
| 2022/0215343 A1* | 7/2022 | Bever | G06F 21/6218 |
| 2022/0237628 A1* | 7/2022 | Wollack | G06Q 50/30 |

* cited by examiner

SUPPORTING ACTION TRACKING AND DEEDS BETWEEN MULTIPLE PARTIES

FIELD OF TECHNOLOGY

The present disclosure relates generally to database systems and data processing, and more specifically to supporting action tracking and deeds between multiple parties.

BACKGROUND

Various online interactions may be performed by or in conjunction with various systems. In some cases, a first system of an online interaction may have no established trust with a second system. For example, some organizations may use social media to perform collaborative, multiparty actions or deeds with other parties with whom they have low-level trust relationships. In some examples, these low-trust relationships may be due to misrepresentation regarding prior acts or deeds, misuse of resources (e.g., funds), no prior relationships, or lack of data that is transparent.

DETAILED DESCRIPTION

Figure 1:
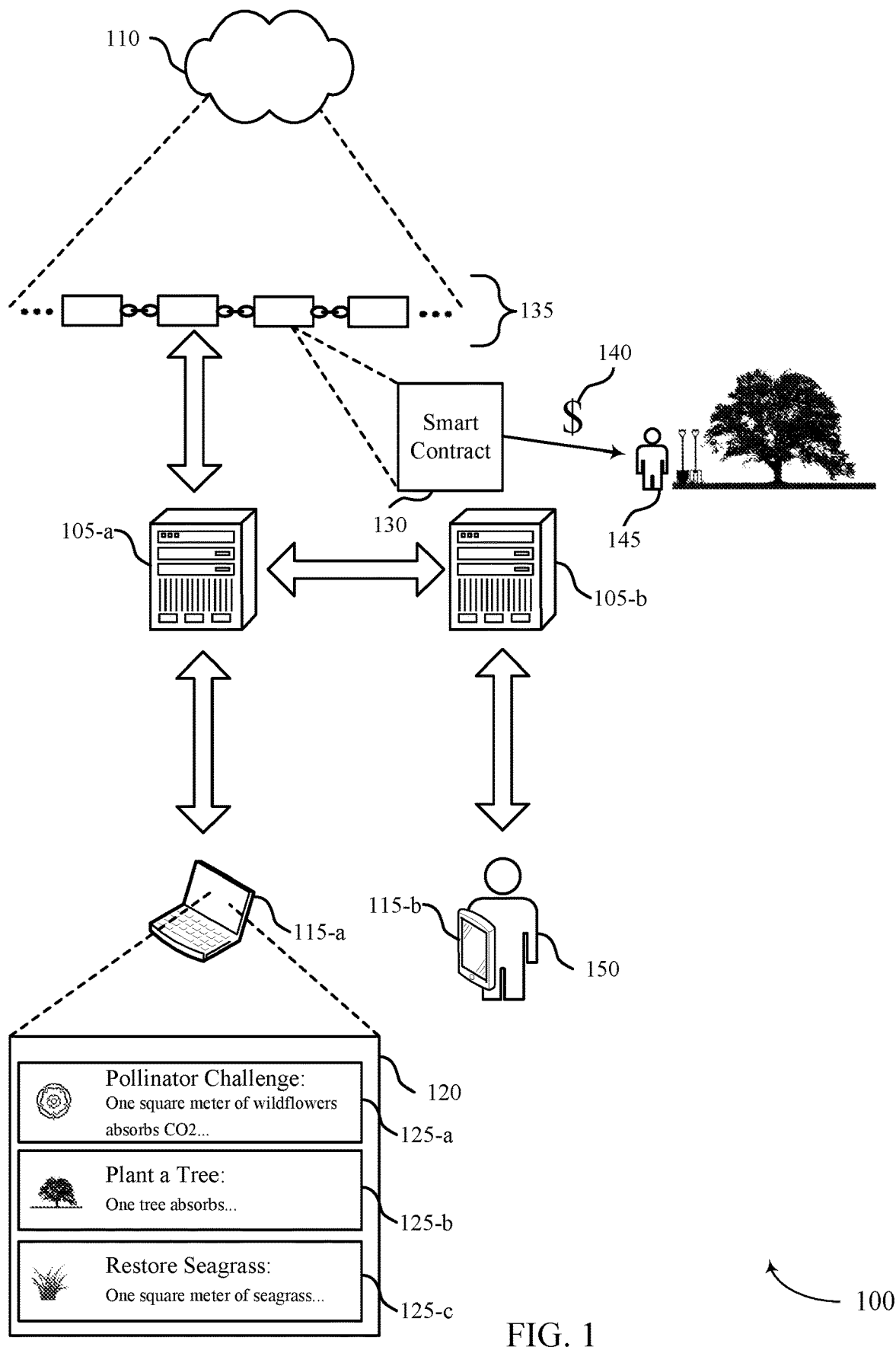
FIG. 1 illustrates an example of a system supporting activating and managing a smart contract system that supports action tracking and deeds between multiple parties in accordance with aspects of the present disclosure.

Various online interactions may be performed by or in conjunction with various systems. In some cases, a first system of an online interaction may have no established trust with a second system. For example, some organizations may use social media to perform collaborative, multiparty actions or deeds with other parties with whom they have low-level trust relationships. In some examples, these low-trust relationships may be due to misrepresentation regarding prior acts or deeds, misuse of resources (e.g., funds), no prior relationships, or lack of data that is transparent.

Techniques described herein support facilitation of online interactions between parties or systems with (or without) low levels of trust. The systems described herein support an online marketplace for a set of projects. Each project may be associated with a quantifiable environmental impact, such as a reduced carbon footprint, a number of carbon credits, a carbon offset/sequester, an increased amount of clean water, etc. In some cases, these quantifiable environmental impacts may be the result of an offer to perform some act, such as plant one tree, plant a square meter of natural grass, or the like. Thus, each project offered on the provided marketplace may be associated with an act that is quantifiable in terms of its environmental impact.

An organization, brand, or the like (e.g., referred to as a sponsor herein) may select a project on the marketplace to activate the project in association with the sponsor. The system may deploy a smart contract on a public blockchain. The smart contract may be conditioned on a funding amount that is provided by the sponsor. Thus, the smart contract may be activated upon receipt of the funding amount (at the smart contract) from the sponsor (e.g., a wallet or key associated with the sponsor). Upon receipt of the funds, the system may activate a monitoring service that monitors data associated with actions performed on an external system (e.g., a social media platform). The monitoring service may monitor the data of the external system in order to determine whether certain actions have been performed. These actions may be predefined in association with the project, prescribed by the sponsor, or a combination thereof. Upon determining that the prescribed actions are performed by users of the external system, the system may cause a funding release action to be performed by the smart contract. The funding release action may cause at least a portion of the funds to be released to the impact provider (e.g., a party in charge of performing the act associated with the quantifiable environmental impact).

Because these actions are performed using a public blockchain system, the various actions and promises, as well as associated data, may be cryptographically verifiable and publicly available. As such, the system described herein provides dashboards, a webservice, etc. that may provide data about each party to these projects, such as the sponsor, impact provider, social media users, etc. Thus, the users and other parties may ascertain and verify a brand or organization impact regarding environmental causes. Further, these brands or organizations may use these statistics and projects to increase awareness. These techniques, variations of these techniques, and associated implementations are described in further detail in association with the figures.

Aspects of the disclosure are initially described in the context of an architecture supporting project selection, contract deployment, and action monitoring. Aspects of the disclosure are further described with respect to a smart contract and a process flow diagram. Aspects of the disclosure are further illustrated by and described with reference to apparatus diagrams, system diagrams, and flowcharts that relate to supporting action tracking and deeds between multiple parties.

FIG. 1 illustrates an example of a system architecture 100 that supports action tracking and deeds between multiple parties in accordance with various aspects of the present disclosure. The system architecture 100 includes servers 105-*a* and 105-*b*, a computing cloud 110, and client devices 115-*a* and 115-*b*. The system architecture 100 may support promising, funding, triggering, and tracking actions, projects, deeds, or events on social media, for use when such deeds, actions, or events use the participation of multiple parties who are to collaborate, or act in concert, or perform acts or actions in a sequential manner, in trustable, transparent ways. Such actions, deeds, or events may be related to persons, places or things, in either physical or digital domains. Thus, the system architecture 100 may support multiparty trust and transparency so that each respective participant can see the activities of the other participant(s).

Some problems may arise when social media is used to perform collaborative, multiparty actions or deeds with other parties with whom they have low-level trust relationships. Reasons for these types low-trust relationships are varied, and may include reasons such as frequent misrepresentation in the categories of acts or deeds which the parties are collaborating, a lack of experience working with the other party, or parties, or, if funds are involved, an uncertainty or fear that promised deeds or acts may not actually be fully funded, or that funds may become depleted, or, regardless if funds are involved, broadly speaking, uncertainty or fear that promises might be broken before the agreed upon act or deed has been performed. Often these situations arise from a lack of transparency.

For instance, on social media, one party (Party A), offers or promise to facilitate, fund, perform an act, or action, or a deed if a second party (Party B) performs an act or action or deed of their own first. This first act by party B triggers the activation of the offer or promise by party A. Fulfillment of the promised action may be by party A, or by a third party (Party C) that has, or has not, been paid to perform the act, or has otherwise agreed to perform the action, or deed, for instance, a third party (party C). Perhaps the Party A offer is comprised of a promise to perform or facilitate an action or deed, but only if Party B first performs a "triggering" action of some type. Such offers are common on social media, for instance, in situations when Party A promises an action or deed if Party B performs a triggering action, for instance, a retweet, share, like, subscribe, post, etc.

However, as explained previously, for various reasons, low-trust may exist between all parties. Low trust typically erodes the effectiveness of acts, or deeds, or transactions between the parties that participate, resulting in lower action and deed quantity, lower action and deed frequency, lower action and deed velocity, and therefore, less action or deed impact. In addition, offers and promises of this type on social media—or even outside of social media—may suffer from a lack of transparency that leaves participants wondering if counterparties have fulfilled their promises. In such instances, trust erodes, or fades, or becomes questioned, or becomes lost. In one example of trust erosion, party A is a sponsor that makes a promise or an offer on a social media platform to perform an act or deed of some type, with the condition that party B acts first to unlock, or trigger, or activate the offer. Party A, for instance, makes an offer to "plant one tree" if party B retweets or shares a social media post, or otherwise engages in some type of action that serves as an offer activation or acceptance or trigger. This is referred to as the "plant one tree" example. Further, party B may activate the offer through the triggering action, for instance, including but not limited to retweeting or sharing a social media post. At this point, after party B's action, party A is expected to plant a tree, or engage or hire a third party (party C) to perform the act. Thus, in this example, after party B activates or triggers the deed, party B may have no way of knowing or validating that the deed was performed by party A or another party (party C).

Aspects of the present disclosure may solve these and related problems related to 1) written contracts that govern the processes and obligations that each party is to perform, 2) funding an act, action, project, or deed, and 3) creating a trusted and transparent record of all actions taken by all parties, a record that is immutable, can be validated by all parties, and one that documents each obligation and the resultant action or activities that are undertaken by each party as they fulfill their obligations in the contract. Such a trusted and transparent record allows all parties to track actions and deeds.

As illustrated in FIG. 1, a server 105-a may support the techniques described herein. For example, the server 105-a may support a project marketplace, smart contract provisioning, monitoring, and execution, platform data monitoring, and associated services. The server 105-a may represent various physical and logical computing systems. In one example, the server 105-a supports a website or application that is accessible by client device 115-a. The client device 115-a may be an example of a computing device that is accessible by person (e.g., employee) associated with an organization or brand. According to techniques described herein, the organization, brand, or the like may become a sponsor of a project.

As illustrated at user interface 120, a marketplace of projects 125 is provided. Each project 125 may be associated with a quantifiable environmental impact, such as reduced carbon, carbon offset, clean water, etc. Further, each project 125 may be associated with an act performed by an impact provider. The acts may include planting a tree, grass restoration, wildflower planting, etc. Impact providers may be examples of organizations that may perform the acts. An organization may access the marketplace using the client device 115-a in order to select and/or purchase a project 125. A project 125 may be an initiative, which represents an offer or a promise by a sponsor to perform, or cause to be performed, an act, or action, or deed, or event, either physical or digital, in a specified manner, dependent upon a counterparty first performing an action of their own to unlock the offer on social media. Each project 125 may be associated with a duration.

The organization may select the project, an amount associated with the project, actions associated with activation of the project, etc. For example, if the organization selects the "plant a tree" project 125-b, then the organization may decide to support the planting of 1000 trees by selecting an amount at a user interface component of the marketplace. Further, the amount be associated with a multiple of the quantifiable environmental impact. Further, a funding amount associated with the selected and configured project may be displayed to the organization/employee. The funding amount may be provided at the marketplace (e.g., using a point of sale service) or may be provided to the smart contract, as described herein.

Upon selection and activation of the project by the organization, the server 105-a may deploy a smart contract 130 on a blockchain 135. The blockchain 135 may be supported by set of computing systems represented by the computing cloud 110. The set of computing systems of the computing cloud 110 may be examples of mining or staking computers that function to execute smart contracts (e.g., smart contract 130) as well as verify transactions occurring between various wallets, contracts, etc. between various parties. The blockchain 135 may function as a cryptographically provable ledger of these transactions, and the ledger may be fully or partially stored on various nodes (computers, miners) supporting the blockchain 135.

The smart contract 130 may be an example of a self-executing contract that encodes provisions of the agreement associated with the selected project 125. The provisions may include funding amount, funding release actions, etc. As described in further detail herein, the smart contract 130 may also encode token distribution to various parties to a project 125. In some cases, the smart contract 130 may not be executable until the funds are locked into (e.g., escrowed into) the smart contract 130. These funds may be provided by the sponsor after selection of the project 125 or may be provided by the system described herein. More particularly, if the sponsor provides funds at the point of sale (POS) of the marketplace, then the marketplace provider may provide the funds to the smart contract for the sponsor. In some examples, the smart contract 130 may represent a set of executable contracts 130 that are associated with the selected project or a set of projects.

Additionally, the selected project may be associated with a set of actions that are to be performed in order to release the funds to the impact provider (e.g., impact provider 145). In some cases, the actions may be preconfigured in association with the project 125. In other cases, the sponsor may select the actions, in addition to the funding release mechanisms associated with the actions. In some cases, an action condition (e.g., a threshold) may be encoded in the smart contract. The sponsor of the project may use a user interface (UI) supported by the server 105-*a* in order to author or configure the smart contract 130 such that the smart contract 130 specifies that the actions that are to be taken by each party to fulfill the terms of the contract as well as other information that defines the parameters of the offer (number of participants, offer quantity, units of action, cost per unit of action, impact projections, attribution, badges and credentials, etc.).

Upon receipt of the funds (e.g., an amount of cryptocurrency or tokens supported by the blockchain or an amount of cryptocurrency or tokens defined in dollars or another currency) at the smart contract, a monitoring service may be activated by the server 105-*a*. The monitoring service may be configured to monitor a data feed of an external system (e.g., server 105-*b*), such as a social media platform. The external system is represented by the server 105-*b*, which may correspond to various physical and logical computing systems that support a service, such as a social media platform. The data may be accessed via endpoint provided by the service, such as an application programming interface (API).

The monitoring service may monitor the data feed to determine whether a triggering action is performed. For example, the monitoring service may monitor the number of interactions, reposts, engagements, etc. associated with a post regarding the sponsor by social media users (e.g., social media user 150). Upon satisfaction of a threshold (e.g., a threshold number of engagements) by actions of social media users, the system may call the smart contract such that a funding release action is performed. The funding release action may be a transaction that transfers a funding amount (e.g., funds 140) to an impact provider 145 associated with the selected project 125. Because this transaction is executed by the smart contract 130 on the blockchain, it may be verifiable and publicly available.

As part of the smart contract 130 authoring process, the project or offer is provisioned with the resources that may be used to fulfill the promise. Such resources may be committed to the collection and storage mechanism. For instance, a project by a sponsor may promise social media users that it will "plant one tree for every retweet" of a social media post. In this "plant one tree" example, during the contract authoring process, the sponsor specifies the action to be taken (plant a tree), the number of actions to be taken (10,000 trees, for instance), and the allocated funds for each tree ($2.00 per tree). So, in the "one tree" example, $20,000 from the sponsor would be collected and stored (e.g., in the smart contract 130). The storage of these funds can take the form of, but is not limited to, an escrow, or a hold on funds charged through a credit card, or via Automated Clearing House Transfers (ACH), or via the transformation of funds into cryptocurrency, or by the transfer of points or tokens, or through collateralized financial instruments or obligations, etc. In some cases, the storage may take the form of physical assets, such as trees, land, airspace, property, equipment, etc.

As described herein, the social media users (e.g., social media user 150) may perform the actions designated in the smart contract 130 and/or in the monitoring service of the server 105-*a*. The actions may include any number of things, including a "like," "share," "retweet," etc. The trigger can be defined in the offer in many other ways, such as the creation of user generated content, the uploading of a file, sending a text message, a digital click of any type (clicking on a link, for instance), listening to a song, reading content, scanning a code, downloading a file, taking a picture, recording a sound, uttering a phrase or speaking a word, performing a physical act, or by smiling, or by taking a pledge, or by numerous other acts or interactions that include interactions with a person, place, or thing. The actual form and manifestation of the triggering mechanism that signals acceptance of the sponsor's offer on the part of the social media user can manifest itself in endless forms and is not limited to the aforementioned. Regardless, the triggering action may be associated with, or contains, the unique persistent identifier, as described herein.

The monitoring service may log each instance of the triggering action (e.g., like, retweet, etc.) as well as information associated with the users (e.g., social media user 150), such as the handle, username, identifier, as well as the unique persistent identifier. As described herein, once a threshold number of triggering actions occur, as designated by the sponsor, the funding amount (e.g., funds 140) may be released to the impact provider 145. The releases may be bundled into tranches or portions, so that transport or transaction costs are limited.

As described herein, the system architecture 100 (e.g., the server 105-*a*) may support a dashboard that provides access to data of various projects, various brands/organizations, actions, etc. For example, the dashboard may support identification of a summation of the quantifiable environmental impacts that an organization has supported through a set of projects offered on the marketplace. Because this data is pulled from the public blockchain 135, the metrics supported by the data may be verifiable by any party. As such, the organizations or brands may advertise their environmental impacts on various platforms (e.g., social media platform), services, etc. In some examples, the dashboard may provide an API that supports querying the data for various parties in order to support display of environmental impact credential on external services.

Each participant may access a dashboard that tracks and reports the progress of each offer. As triggering actions occur, and as the distributed ledger is updated, and as resources are released from the contract 130, the dashboard may reflect the activity as reported under the unique persistent identifier. Dashboards can be customized to each user class, so that sponsors, social media users, and impact providers may each have their own customized view of activities. However, in some cases a single unified dashboard may be used, one that is shared by all users in a unified view. The use of dashboards may support user registration and login.

In some cases, the participants to the system architecture 100, including the impact providers (e.g., impact provider 145), the sponsors, and the social media users 150 may receive certificates, credentials, microcredentials, or badges, awards, or micro certificates that reflect their actions, deeds, outcomes, or impacts. Such credentials or badges, designed for use to share and display on social media platforms and digital communication platforms, may be stored in the dashboard of each party. Such certificates and credentials and badges may feature embedded hyperlinks or other types of links that bring up data and information such as the impact of the deed or action, how it was triggered, who sponsored it, impact provider information, etc. Badges and credentials can be issued for individual actions, bundled actions, cumulative acts, sponsored acts, and so on. Dashboards may also contain lists and offers for upcoming deeds, early access offers, friendly competitions among users, leader boards, special content, news about platform users, solicitations to join groups, build community, and so on.

In some examples, these credentials may be in the form of tokens that are distributed by the smart contract 130, another smart contract, the server 105-a, etc. For example, the tokens may be supported by the blockchain 135. In some examples, the tokens may be examples of non-fungible tokens (NFTs). The tokens may reflect the amount if impact (e.g., the amount of quantifiable impact) that that the user or party contributed via the projects 125 and the smart contract 130.

Thus, as described with respect to FIG. 1, various aspects are supported by the system architecture 100. For example, the system supports various projects 125, parties that include a sponsor, social media users, impact providers, adjacency service providers, a smart contract 130, a collection and storage mechanism, a unique persistent identifier, a dashboard, impact metrics, and APIs.

The sponsor may be the party that makes a pledge a pledge, a promise, or an offer to fulfill or complete the project 125, which is an act, action, deed, event, etc., and which may be offered to social media users. The social media users may be users or members of any social media platform, and who review the sponsor's offer, and upon review and acceptance of the offer, activate the offer via a triggering action, and who are provided with a dashboard to track, and collect, and share, and validate, and manage the actions and deeds that they have unlocked, etc.

The impact providers may be the party who fulfill the project pledge, or the promise, by performing or making real the sponsor's promised act, action, deed or event, such that the terms of the promise and the smart contract are fulfilled. Impact providers may be part of a sponsor's organization, or outside of it, or they can be vendors, or partners, or affiliates, or volunteers, members of clubs, or organizations of all types. Adjacency service providers, which may include insurers that insure projects, arbitrage providers who provide funds and resources and liquidity services, financial service providers, auditors, certificate issuers, etc.

The smart contract 130 (or a set of smart contracts) may govern the project and the activities and responsibilities and actions of the parties, and which defines a goal, and defines the obligations of each party, and which may contain provisions about the sequence in which each party is to act, the time in which they are to act, penalties for inaction, bonuses for special actions, etc. The smart contract uses blockchain technology to govern the terms around an action or event and holds all participating parties accountable for meeting the terms, and uses distributed ledger technology (DLT) to maintain an immutable record of transactions and events performed as part of the smart contract. In this way, actions can be validated and verified, audited, or otherwise proven.

The collection and storage mechanism may serve to collect, then hold in abeyance, or save, or freeze, or collect, or escrow, and retain any resources that are used to fund, or act, or activate, or make real, the project and to perform the act or deed as promised. The collection and storage mechanism and the hold and save functionality it provides may be manifested in digital form, or physical form, through escrows or transaction holds, etc. The collection and storage mechanism may be implemented by the smart contract 130, as described herein.

A unique persistent identifier may be a number, code, alphanumeric string, phrase, hashtag, badge, symbol, mark, etc., or any device or thing that is uniquely identifiable, and that is assigned to each smart contract and each project 125 or offer, and carries through each action and every component listed herein. The unique persistent identifier is recorded in the smart contract, then used and recorded in each sequential action, step, or component of the system. The unique persistent identifier identifies each project, and associated action, or deeds action or event, to identify it uniquely. A trigger may be a triggering action, performed by the social media user, and stipulated in the smart contract, that acts as an acceptance of the offer from the sponsor, and which activates the offer, and activates, or releases, or unlocks resources from the collection and storage mechanism, which holds such resources in reserve as it awaits the trigger or triggering action by the social media user to unlock resources including but not limited to funds or tokens, etc. As described herein, the trigger may be a threshold (e.g., an engagement threshold) that causes the funding release action to be executed.

The dashboard may keep a record of or record actions by all participants, including their social media identification handle or name or identity, the projects that they have participated in, and the outcomes of the project(s), which may include outcomes and impact information, including cumulative impact measurements of across multiple projects. The dashboard may contain credentials or badges or micro certificates that are awarded for successful completion of projects or accomplishments related to outcomes and impacts. Impact metrics may correspond to measurements of the outcomes or impacts or other measurements of the project, or acts, actions, deeds, events, etc., for use with the dashboard, or for integration with other platforms or systems, via APIs, or for use with partners, licensees, etc. The APIs may integrate with other solutions, software, systems, methods, platforms, etc., and extend the features and functionality, data, etc., of the techniques described herein to associates, or partners, or third parties.

It should be appreciated by a person skilled in the art that one or more aspects of the disclosure may be implemented in a system architecture 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
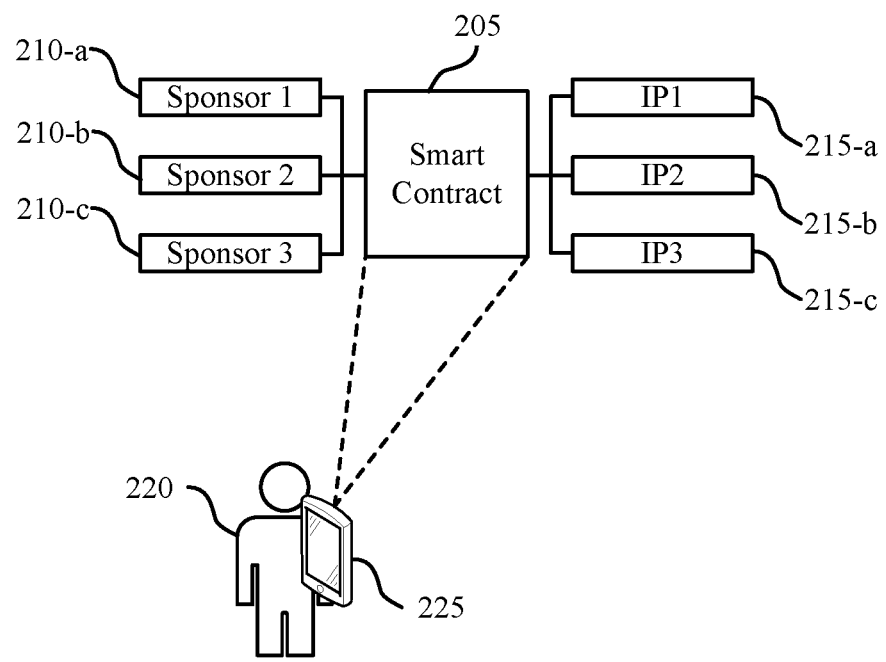
FIG. 2 illustrates an example of a system architecture that supports action tracking and deeds between multiple parties in accordance with aspects of the present disclosure.

FIG. 2 illustrates an example of a smart contract diagram 200 that supports action tracking and deeds between multiple parties in accordance with aspects of the present disclosure. As described herein, the smart contract diagram includes a smart contract 205 that may be provisioned and deployed by a system (e.g., a server 105-a of FIG. 1) to a blockchain (e.g., blockchain 135 of FIG. 1) supported by various computing systems. The smart contract 205 may be configured by a sponsor or may be preconfigured and associated with a project selected by the sponsor.

As illustrated in FIG. 2, the smart contract 205 is an example of a multiparty smart contract for a multiparty project. The system supports offers and deeds that may be packaged into curated bundles. For instance, the offers from multiple sponsors (e.g., sponsors 210-a) may be bundled into packages that offer social media users an assortment of deeds and impacts. Such an approach can help users quickly develop micro portfolios of deeds and actions that they can build upon over time. Such portfolios may be comprised of multiple micro deeds that add up over time, for instance, an environmental impact package composed of multiple micro offers from many sponsors, is just one example.

The actions and activities of each sponsor 210 and each impact provider 215 in the bundle are managed by the smart contract 205, so that a bundle can be designed with differing attributes for each participant. For instance, the deed to be unlocked may be a blended bundle of actions or deeds such as A) sponsor 210-a promises to plant one tree using impact provider 215-c, sponsor 210-b promises to sequester 50 pounds of carbon with impact provider 215-a, and sponsor 210-c promises to compost 1 cubic yard of urban food waste with impact provider 215-b. Further, offers may be of any size, including micro offers for micro-acts or micro-deeds. For example, using the "plant one tree" scenario, the offer can scale down to plant ½ a tree, or ¼ of a tree, etc. Micro deeds can be used to create bundled offers and deeds.

The system described herein may also support multiple forms of physicality. For instance, a person, place or thing can be provisioned with a scannable sticker, or a wireless beacon, or a representation or thing that brings up an offer on a user's phone. This type of physicality also includes locations, so that a social media user can trigger an action by a sponsor by visiting a location, or entering a room, or crossing a line, or by moving an object to a specified location, or by entering or leaving a geofenced zone or area. In this way the techniques described herein may not be limited solely to the digital domain, but can cross over into the physical domain in many ways. In some cases, the impact may be digitally represented. For example, the impact (e.g., a planted tree) may be digitized (e.g., using a picture of a planted tree) and stored by or in relation to the blockchain. For example, data represented the picture of the tree may be stored on the blockchain (e.g., and referenced by the smart contract 205, the dashboard, or both). In other examples, the picture of the tree may be associated with a unique identifier (e.g., a token identifier) and may be transferrable via the blockchain (e.g., as an NFT).

Offers and triggers may be accomplished in groups. For instance, an offer from a sponsor may be predicated on the formation of a group or team of social media users to trigger the action or deed. Or, multiple social media users may form together to jointly trigger acts, or create acts in a sort of reverse bidding scenario, in which they solicit funding or resources for an act or deed.

Further, the offers from sponsors may be embedded into products and services, either digital or physical, and timed along product life cycles so that the offer becomes active at points in the product life cycle. For instance, the manufacturer of a vacuum cleaner with an expected lifespan of 3 years might activate an offer to plant three trees if the product is responsibly retired, or refurbished, or upgraded after 2½ years. Or, a service that is renewed before expiry triggers an action or deed. Such functionality is not limited to the aforementioned examples, but through the smart contract 205 may be embedded into all types of products and services, especially those that involve renewals, upgrades, purchases returns, recycling, rebuilding, returns, etc. In the vacuum cleaner example, the sponsor may escrow the impact funds in the smart contract 205, and upon retirement or refurbishment by a vacuum (e.g., at a sponsored supported service that is monitored by the monitoring service), the funding release action may be executed at the smart contract 205 such that the funds (or a portion thereof) are released to the impact provider 215.

In some cases, agency service providers may be included in techniques described herein. For example, in the case of product and service embedding, or other types of offers and actions and deeds, extended time periods between offer issuance and triggering actions may occur, such as in the case of the vacuum cleaner manufacturer that offers to plant 3 trees 2½ years after the purchase of their product. Since sponsors allocate resources to projects as they are authored into smart contracts, and since these resources may constitute constraints (financial, etc.), in some cases resources can be reallocated to adjacency service providers. For instance, a sponsor may wish to partner with an arbitrage provider, such that the sponsor authors the smart contract and specifies the trigger for the offer, and the offer is assigned a unique persistent identifier, and resources are allocated and locked into the collection and storage mechanism. At this point the sponsor may lock up their resources for 2½ years, until the smart contract offer activates in the vacuum cleaners lifecycle. For various reasons, however, locking up funds in this way for an extended period can have negative business consequences. Therefore, the sponsors resource obligations can be sold or traded to an arbitrage party that pays the sponsor to assume the funding obligation. At this point the arbitrage provider has assumed all performance obligations for the original offer from the sponsor, along with the promised action or deed or event that is to be delivered. After 2½ years, as the Offer becomes valid and is unlocked by users the resources promised by the arbitrage provider are unlocked to be distributed to the impact provider 215. In addition, adjacency service providers may include but are not limited to. auditors, insurers, partners, third parties, credential issuers, financial service providers, or other parties.

In some examples, the offer may be discovered by a user 220 via an advertisement, on packaging, on a poster, etc., the user employs 1) their mobile phone (e.g., device 225) to 2) scan a code or image that is associated with the sponsor's promise or offer, then 3) the scanning action, interactions or trigger is reported back to the system described herein, along with the unique persistent identifier that is associated with the offer's smart contract. As such, the device 225 may be used to interact with the smart contract 205 using a physical object, and such actions may trigger a funding release action from the smart contract 205 such that the impact provider 215 is provided funds.

As discussed herein, deeds actions and events that are triggered using the system may have measurable outcomes and impacts that can be attributed either to the sponsors 210, or to the users (e.g., user 220), or to the impact providers 215, or a combination thereof. For instance, considering the "plant one tree" offer, the newly planted tree may result in a reduction of "X" pounds of carbon in the Earth's atmosphere. The "X" amount can be attributed to any of the participating three parties (sponsor 210, user 220, and impact provider 215), or the attribution can even be sold, or "gifted" to another party (a fourth party). Using the example of the newly planted tree, and assuming that the attribution will be split between the four parties outlined previously, and assuming the newly planted tree reduces carbon by 100 pounds (a sample number), the attribution may be split evenly between the parties, at 25 pounds of impact attribution for each. The number of participants and the attribution formula may be variable, and in some cases just one party may receive all attribution. As described herein, the attribution may be in the form of a token, point, or other like resources, distributed by the smart contract 205, a related smart contract, or a related service or system.

The system may also implement fraud protection mechanisms such as a short embargo may be applied to the trigger, in order to ensure that the trigger was performed by a legitimate social media user, as opposed to a bot. Automated methods may also be used so that such embargos are not required, or so that they are only momentary in nature.

Further, the techniques described herein may be implemented as customer loyalty programs (e.g., credit card programs), other financial services, government sponsored programs, such that the actions and deeds may be transparently and trustfully integrated into such systems and platforms. Further, the techniques described herein may constitutes a new way to build marketing campaigns and promotions that are build strong bonds with consumers in highly trusted and transparent ways. Examples include but not limited to "one for one" campaigns (buy one product or service and have one tree planted, for instance), "act now to unlock this offer," offers to perform acts or deeds in return for service renewals, or products and services upgrades, etc. In addition, not unlike social bonds, such offers can be used to foster positive outcomes that unlock offers. For instance, someone who shares their milestone of achievement related to performing a not-inconsequential task of benefit to themselves or society might unlock a good deed or action using these techniques in a way that triggers another good deed or action, and so on.

The techniques described herein may also leverage gamification among participants to foster, or amplify actions, deeds, engagement, and activity. For instance, points can be awarded for activities, such as when offers, actions, or deeds, are unlocked by users, or, points may be awarded as badges and certificates are issued. In addition, the dashboard can be provisioned with leaderboards that encourage users to engage in friendly competition to unlock offers or collect badges or points. In addition, reward triggers can be built into the system, including, but not limited to, early access to new offers, boosted impact offers, limited edition offers, special actions, or deeds, etc.

In some examples, the techniques described herein may be used with systems other than social media. For example, a private bank, loyalty rewards, or credit card program may have its own private platform or network for communication and transactions with customers, or with the public, or with partners and third parties. In a similar manner, the techniques may be used with public, or private platforms, or networks from governments or non-governmental organizations (NGOs). In such cases the communication and networking functions of the private, government, or NGO network or platform serve to simply replace the social media user component. For example, the monitoring service described herein may be activated and may be configured to access the system that provides the data in order to determine that the triggering action is satisfied and trigger the funding release action execution at the smart contract 205.

Figure 3:
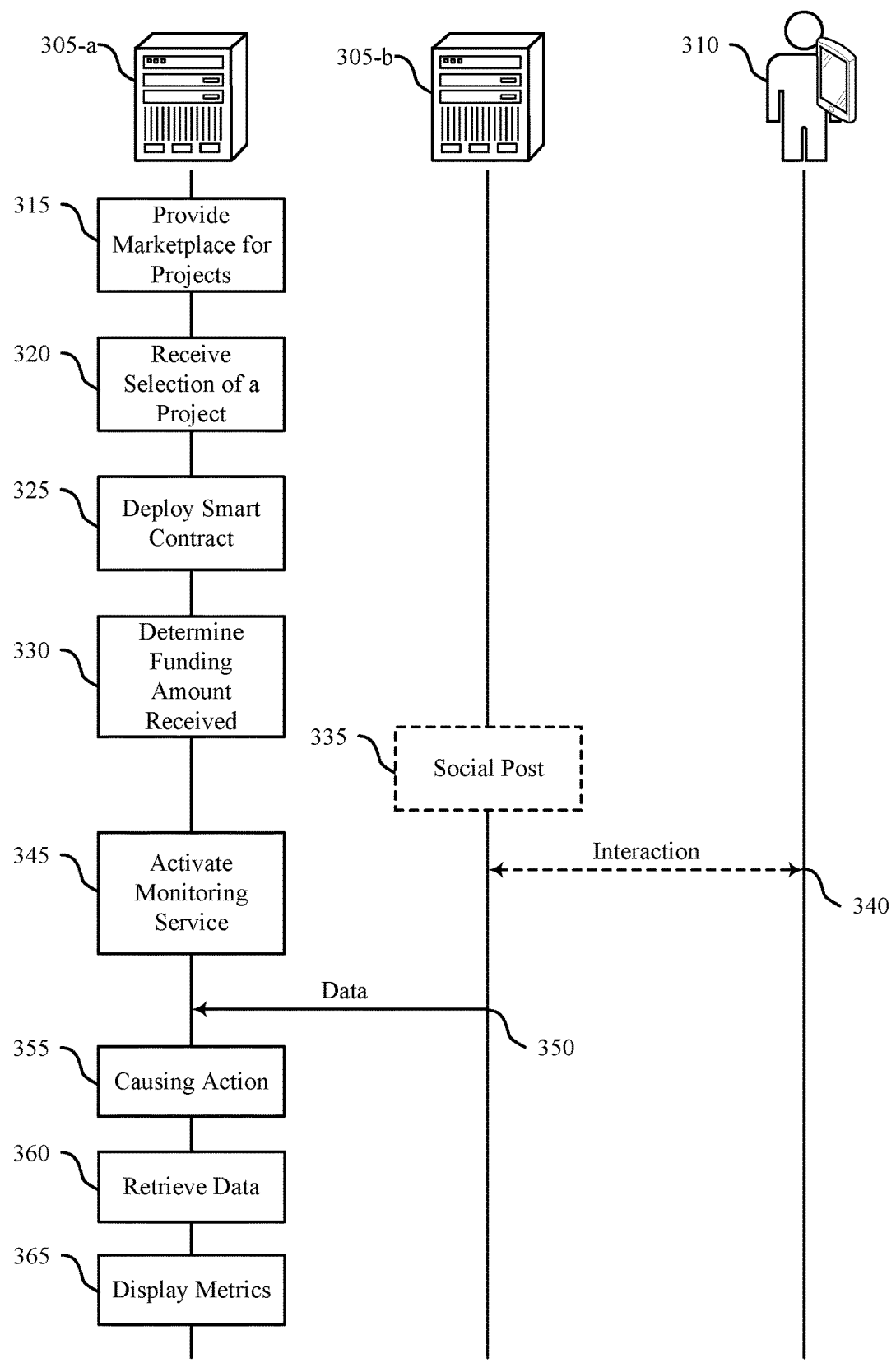
FIG. 3 illustrates an example of a diagram that supports action tracking and deeds between multiple parties in accordance with aspects of the present disclosure.

FIG. 3 illustrates an example of a process flow 300 that supports action tracking and deeds between multiple parties in accordance with aspects of the present disclosure. The process flow 300 may be implemented by aspects of the systems described with respect to FIGS. 1 and 2. For example, the process flow 300 includes a server 305-a, which may be an example of the server 105-a as described with respect to FIG. 1, and a server 305-b, which may be an example of the server 105-b as described with respect to FIG. 1. The process flow also includes a user 310 (e.g., a social media user 310). The process flow 300 may be implemented by the servers 305 and the social media user 310 in order to support action tracking a deeds between multiple parties.

In the following description of the process flow 300, the operations may be performed in a different order than the order shown, or the operations performed by server 305-a and server 305-b may be performed in different orders or at different times. For example, specific operations may also be left out of the process flow 300, or other operations may be added to the process flow 300. Although UE servers 305 and user 310 are shown performing the operations of the process flow 300, some aspects of some operations may also be performed by one or more other devices.

At 315, the server 305-a may provide a marketplace for a plurality of projects, wherein each project is associated with a respective funding amount for a quantifiable environmental impact. The marketplace may be an example of a website, webservice, web application, or the like. The marketplace may include a listing of the plurality of projects. In some examples, each of the projects may be input by an impact provider. The marketplace may display the quantifiable environmental impact associated with each project, a cost of the project/impact, etc. In some examples, the projects are listed in the marketplace are reusable by various sponsors (e.g., plant one tree or plant 1000 trees).

At 320, the server 305-a may receive, from a sponsor, a selection of a project of the plurality of projects. The selected project may be associated with a funding amount. For example, a project may be plant one tree, and the funding amount is $2. However, the sponsor may select a multiple of the project, such as plant 1000 trees, such that the funding amount is $2000.

At 325, the server 305-a may deploy a smart contract on a blockchain. The smart contract may be conditioned on receiving the funding amount from the sponsor. In some examples, various provisions of the smart contract (e.g., triggering actions, funding amount portion releases, duration of deployment, duration until potential funding release) may be configured at an authoring tool supported by the server 305-a. In other cases, the provisions may be automated or preconfigured. In some cases, the server 305-a may assign a unique identifier (e.g., a unique persistent identifier) to the project, and the identifier may be associated with the smart contract.

At 330, the server 305-a may determine that the funding amount is transmitted to the smart contract by the sponsor based on monitoring the smart contract on the blockchain. For example, the server 305-a may be configured with a cryptocurrency wallet associated with the sponsor (e.g., the sponsor may enter wallet information, such as a public key, at the marketplace). The server 305-a may monitor transactions on the blockchain, and more particularly with the deployed smart contract, to determine that that the wallet associated with the sponsor has transmitted the funds to the smart contract. In some examples, the server 305-a may be configured to wait for a particular duration or until a threshold number of confirmations (of the funding transaction) are completed until determining that the amount is transmitted. In some examples, the sponsor may provide the funds via a point of sale, and the funding amount is escrowed into the smart contract by another service.

At 335, the sponsor or the server 305-a may make a social media post on a platform supported by the server 305-b. The post may reference the deed or project the sponsor has selected. The post may be associated with the triggering action that is to performed by the users 310 in order to release the funds from the smart contract. At 340, the users 310 may interact with the social media post. The interaction may include reposts, retweets, likes, favorites, shares, and the like. In some cases, the post may reference the smart contract on the blockchain via the unique identifier, such that that the users 310 may verify the authenticity of the deed associated with the smart contract and post.

At 345, the server 305-*a* may activate a monitoring service that monitors a data feed of an external system to determine whether a triggering action is performed. The data feed may include data corresponding to actions performed on the external system by a plurality of user identifiers in association with the sponsor. In the social media example, the data may correspond to the engagement by the users 310 with the social media posts. As described herein, the external system supported by the server 305-*b* may be examples of systems other than the social media platforms. For example, the system may be an employee data provider (e.g., that monitors actions performs by employees in association with employment, such as sales, product releases, milestones). The system may be a financial services system (e.g., a credit card service), advertising system, email distribution system, etc. The external systems may be configured to monitor various types of user data and actions in association with the system. As described, this data may be used to determine whether a triggering action is performed. The monitoring service may be configured to monitor or access the smart contract, the actions, etc. via the unique identifier.

At 350, the server 305-*a* may receive the data according to the monitoring service, The data may be accessed via an API, a batch processing service, a live data stream service, or the like.

At 355, the server 305-*a* may cause a funding release action to be executed by the smart contract in accordance with the triggering action being performed at the external system. The funding release action may release at least a portion of the funding amount to the sponsor, a provider for the project, or both. In some cases, the monitoring service may determine that a first threshold number of engagements or actions are performed by the users 310. The funding release action may be performed by calling the smart contract on the blockchain (e.g., by the data monitoring service, the sponsor, or some associated service). In some examples, the smart contract is provisioned such that a particular party or parties (e.g., a multi-signature execution) may be able to call the funding release action.

At 360, the server 305-*a* may retrieve from the blockchain, data corresponding to a set of projects that have been activated on the blockchain, the data corresponding to the set of projects including an indication of sponsors, quantifiable environmental impacts associated with the set of projects, funding amounts associated with the set of projects, funding amount release associated with the set of projects, tokens that have been distributed associated with the set of projects, or a combination thereof. The server 305-*a* may be configured to continuously or periodically monitor the various projects and smart contracts.

At 365, the server 305-*a* may cause display, at a user interface or at a social media platform, one or more metrics associated with the retrieved data. In some examples, the metrics may be carbon offset, or the like. The metrics may be displayed via one or more credentials, tokens, etc. Facilitation of the display may be performed via one or more APIs offered by the server 305-*a*. In some cases, one or more digital tokens may be distributed to the parties to the project, and the tokens may represent the quantifiable impact. In some examples, the tokens may be distributed by the deployed smart contract or an associated smart contract on the blockchain. As such, these tokens may be cryptographically verifiable.

Figure 4:
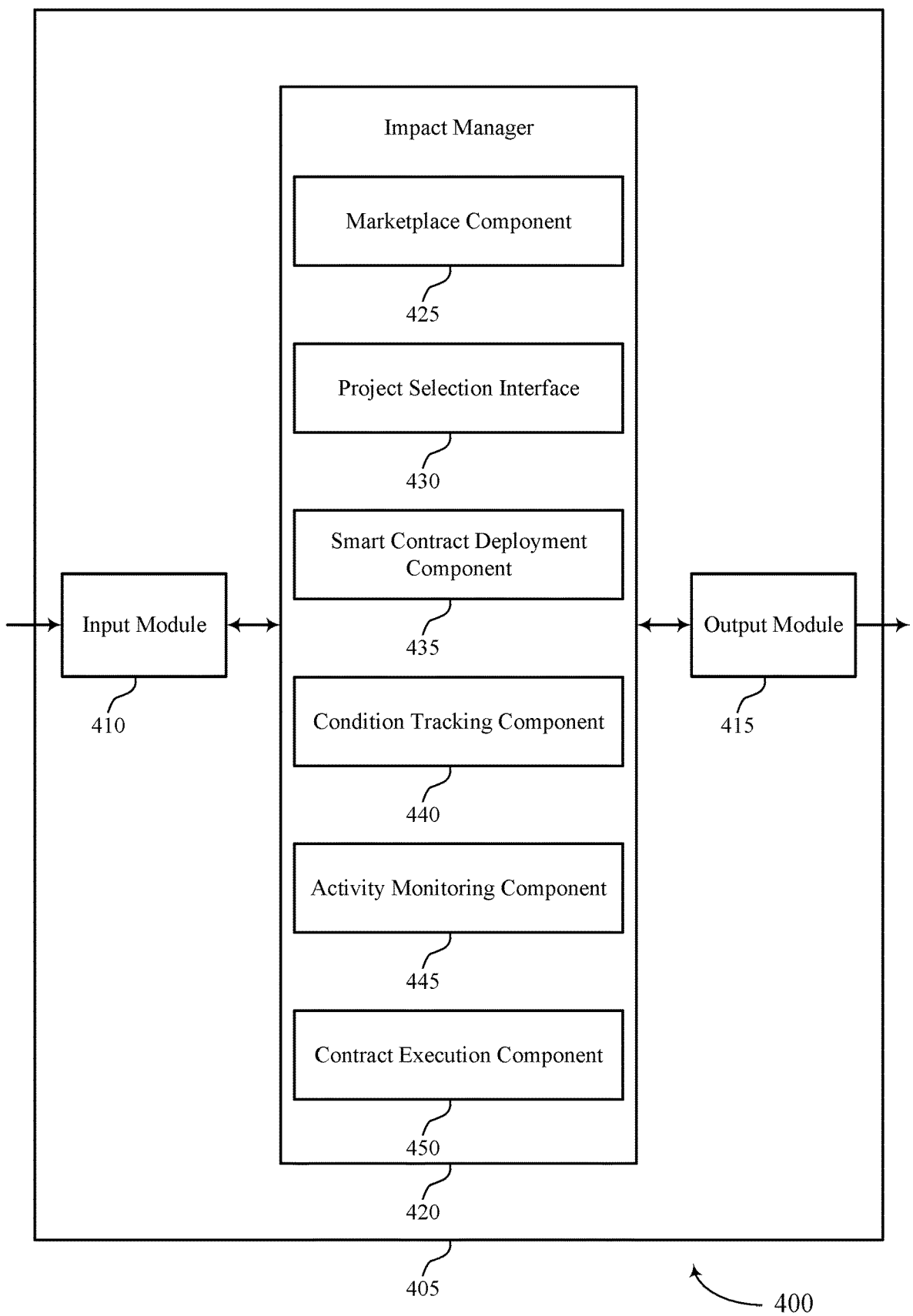
FIG. 4 shows a block diagram of an apparatus that supports action tracking and deeds between multiple parties in accordance with aspects of the present disclosure.

FIG. 4 shows a block diagram 400 of a device 405 that supports action tracking and deeds between multiple parties in accordance with aspects of the present disclosure. The device 405 may include an input module 410, an output module 415, and an impact manager 420. The device 405 may also include a processor. Each of these components may be in communication with one another (e.g., via one or more buses).

The input module 410 may manage input signals for the device 405. For example, the input module 410 may identify input signals based on an interaction with a modem, a keyboard, a mouse, a touchscreen, internet of things (IoT) device, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the impact manager 420 to support action tracking and deeds between multiple parties. In some cases, the input module 410 may be a component of an I/O controller 610 as described with reference to FIG. 6.

The output module 415 may manage output signals for the device 405. For example, the output module 415 may receive signals from other components of the device 405, such as the impact manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the impact manager 420 may include a marketplace component 425, a project selection interface 430, a smart contract deployment component 435, a condition tracking component 440, an activity monitoring component 445, a contract execution component 450, or any combination thereof. In some examples, the impact manager 420, or various components thereof, may be configured to perform various operations (e.g., receiving, monitoring, transmitting) using or otherwise in cooperation with the input module 410, the output module 415, or both. For example, the impact manager 420 may receive information from the input module 410, send information to the output module 415, or be integrated in combination with the input module 410, the output module 415, or both to receive information, transmit information, or perform various other operations as described herein.

The impact manager 420 may support activating and managing a smart contract on a blockchain in accordance with examples as disclosed herein. The marketplace component 425 may be configured as or otherwise support a means for providing, a marketplace for a plurality of projects, where each project is associated with a respective funding amount for a quantifiable environmental impact. The project selection interface 430 may be configured as or otherwise support a means for receiving, from a sponsor, a selection of a project of the plurality of projects, and the project is associated with a funding amount. The smart contract deployment component 435 may be configured as or otherwise support a means for deploying the smart contract on the blockchain, wherein the smart contract is conditioned on receiving the funding amount from the sponsor. The condition tracking component 440 may be configured as or otherwise support a means for determining that the funding amount is transmitted to the smart contract by the sponsor based at least in part on monitoring the smart contract on the blockchain. The activity monitoring component 445 may be configured as or otherwise support a means for activating a monitoring service that monitors a data feed of an external system to determine whether a triggering action is performed, wherein the data feed includes data corresponding to actions performed on the external system by a plurality of user identifiers in association with the sponsor. The contract execution component 450 may be configured as or otherwise support a means for causing a funding release action to be executed by the smart contract in accordance with the triggering action being performed at the external system, wherein the funding release action releases at least a portion of the funding amount to the sponsor, a provider for the project, or both.

Figure 5:
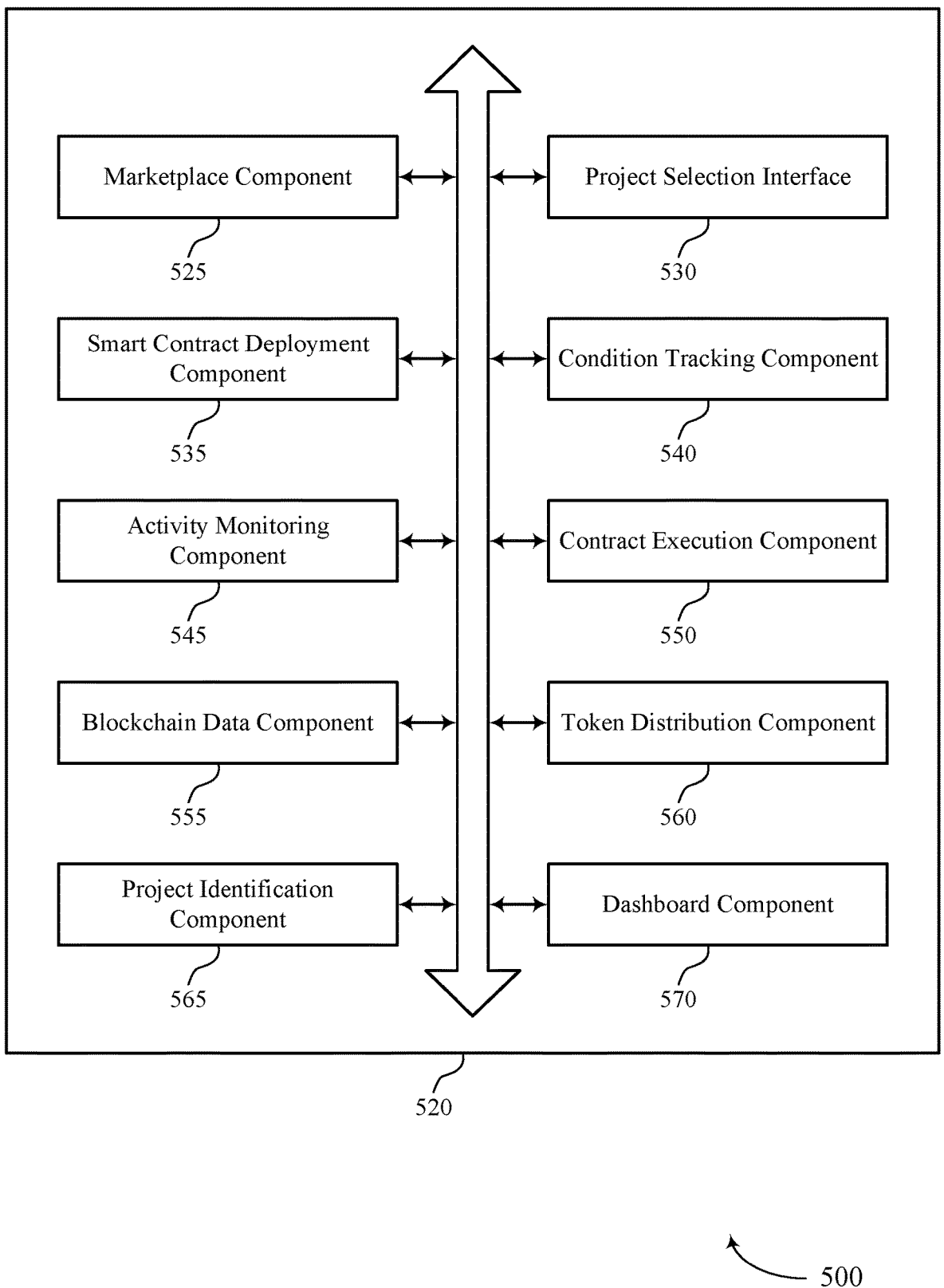
FIG. 5 shows a block diagram of an impact manager that supports action tracking and deeds between multiple parties in accordance with aspects of the present disclosure.

FIG. 5 shows a block diagram 500 of an impact manager 520 that supports action tracking and deeds between multiple parties in accordance with aspects of the present disclosure. The impact manager 520 may be an example of aspects of an impact manager or an impact manager 420, or both, as described herein. The impact manager 520, or various components thereof, may be an example of means for performing various aspects of supporting action tracking and deeds between multiple parties as described herein. For example, the impact manager 520 may include a marketplace component 525, a project selection interface 530, a smart contract deployment component 535, a condition tracking component 540, an activity monitoring component 545, a contract execution component 550, a blockchain data component 555, a token distribution component 560, a project identification component 565, a dashboard component 570, or any combination thereof. Each of these components may communicate, directly or indirectly, with one another (e.g., via one or more buses).

The impact manager 520 may support activating and managing a smart contract on a blockchain in accordance with examples as disclosed herein. The marketplace component 525 may be configured as or otherwise support a means for providing, a marketplace for a plurality of projects, where each project is associated with a respective funding amount for a quantifiable environmental impact. The project selection interface 530 may be configured as or otherwise support a means for receiving, from a sponsor, a selection of a project of the plurality of projects, and the project is associated with a funding amount. The smart contract deployment component 535 may be configured as or otherwise support a means for deploying the smart contract on the blockchain, wherein the smart contract is conditioned on receiving the funding amount from the sponsor. The condition tracking component 540 may be configured as or otherwise support a means for determining that the funding amount is transmitted to the smart contract by the sponsor based at least in part on monitoring the smart contract on the blockchain. The activity monitoring component 545 may be configured as or otherwise support a means for activating a monitoring service that monitors a data feed of an external system to determine whether a triggering action is performed, wherein the data feed includes data corresponding to actions performed on the external system by a plurality of user identifiers in association with the sponsor. The contract execution component 550 may be configured as or otherwise support a means for causing a funding release action to be executed by the smart contract in accordance with the triggering action being performed at the external system, wherein the funding release action releases at least a portion of the funding amount to the sponsor, a provider for the project, or both.

In some examples, the external system comprises a social media platform, and the activity monitoring component 545 may be configured as or otherwise support a means for monitoring the data feed that includes the data corresponding to interaction with one or more social media profiles associated with the sponsor, wherein the funding release action is activated in response to satisfaction of one or more engagement thresholds by the interaction.

In some examples, the contract execution component 550 may be configured as or otherwise support a means for periodically causing execution of the funding release action upon satisfaction of a triggering action condition based at least in part on the data of the data feed, the funding release action being executed to release the portion of the funding amount until the funding amount is depleted.

In some examples, the blockchain data component 555 may be configured as or otherwise support a means for retrieving, from the blockchain, data corresponding to a set of projects that have been activated on the blockchain, the data corresponding to the set of projects including an indication of sponsors, quantifiable environmental impacts associated with the set of projects, funding amounts associated with the set of projects, funding amount release associated with the set of projects, tokens that have been distributed associated with the set of projects, or a combination thereof.

In some examples, the dashboard component 570 may be configured as or otherwise support a means for causing display at a user interface or at a social media platform, one or more metrics associated with the retrieved data.

In some examples, the sponsor is associated with a public key and, to support determine that the funding amount is transmitted, the condition tracking component 540 may be configured as or otherwise support a means for determining that an account associated with the public key has transmitted the funding amount to the smart contract based at least in part on monitoring the public key on the blockchain.

In some examples, the token distribution component 560 may be configured as or otherwise support a means for distributing one or more digital tokens to the sponsor, one or more of the plurality of user identifiers, the provider, or a combination thereof, wherein the one or more digital tokens represent the quantifiable environmental impact.

In some examples, to support distributing the one or more digital tokens, the token distribution component 560 may be configured as or otherwise support a means for causing execution, by the smart contract, a digital token release action to distribute the one or more digital tokens.

In some examples, the project identification component 565 may be configured as or otherwise support a means for assigning a unique identifier to the project. In some examples, the project identification component 565 may be configured as or otherwise support a means for assigning the unique identifier to the smart contract. In some examples, the project identification component 565 may be configured as or otherwise support a means for activating the monitoring service in association with the unique identifier, wherein the unique identifier is used to monitor the actions performed on the external system and cause the funding release action to be executed.

Figure 6:
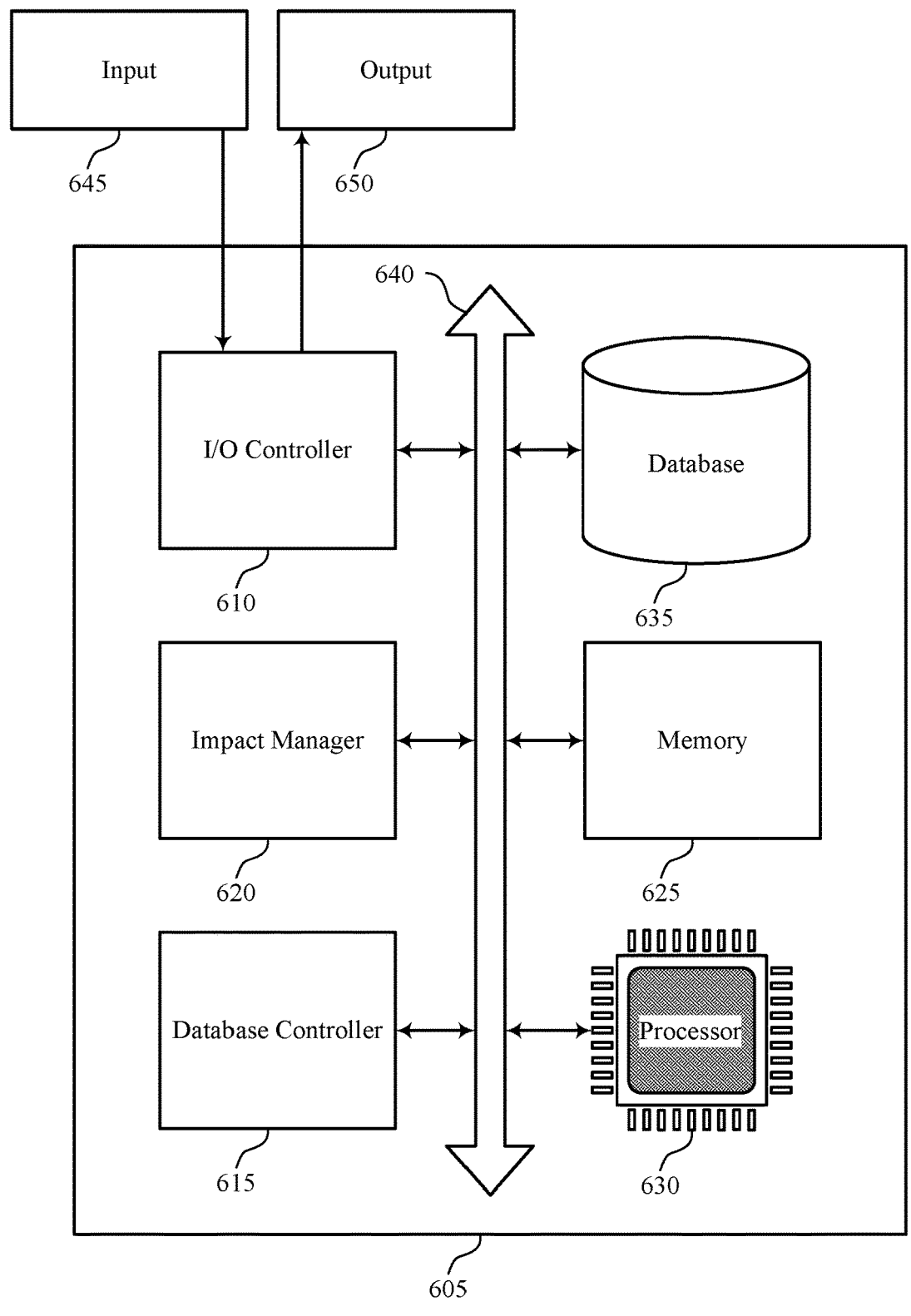
FIG. 6 shows a diagram of a system including a device that supports action tracking and deeds between multiple parties in accordance with aspects of the present disclosure.

FIG. 6 shows a diagram of a system 600 including a device 605 that supports action tracking and deeds between multiple parties in accordance with aspects of the present disclosure. The device 605 may be an example of or include the components of a device 405 as described herein. The device 605 may include components for bi-directional data communications including components for transmitting and receiving communications, such as an impact manager 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, IoT device, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a basic input/output system (BIOS) which may control basic hardware or software operation such as the interaction with peripheral components or devices.

The processor 630 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting action tracking and deeds between multiple parties).

The impact manager 620 may support activating and managing a smart contract on a blockchain in accordance with examples as disclosed herein. For example, the impact manager 620 may be configured as or otherwise support a means for providing, a marketplace for a plurality of projects, where each project is associated with a respective funding amount for a quantifiable environmental impact. The impact manager 620 may be configured as or otherwise support a means for receiving, from a sponsor, a selection of a project of the plurality of projects, and the project is associated with a funding amount. The impact manager 620 may be configured as or otherwise support a means for deploying the smart contract on the blockchain, wherein the smart contract is conditioned on receiving the funding amount from the sponsor. The impact manager 620 may be configured as or otherwise support a means for determining that the funding amount is transmitted to the smart contract by the sponsor based at least in part on monitoring the smart contract on the blockchain. The impact manager 620 may be configured as or otherwise support a means for activating a monitoring service that monitors a data feed of an external system to determine whether a triggering action is performed, wherein the data feed includes data corresponding to actions performed on the external system by a plurality of user identifiers in association with the sponsor. The impact manager 620 may be configured as or otherwise support a means for causing a funding release action to be executed by the smart contract in accordance with the triggering action being performed at the external system, wherein the funding release action releases at least a portion of the funding amount to the sponsor, a provider for the project, or both.

Figure 7:
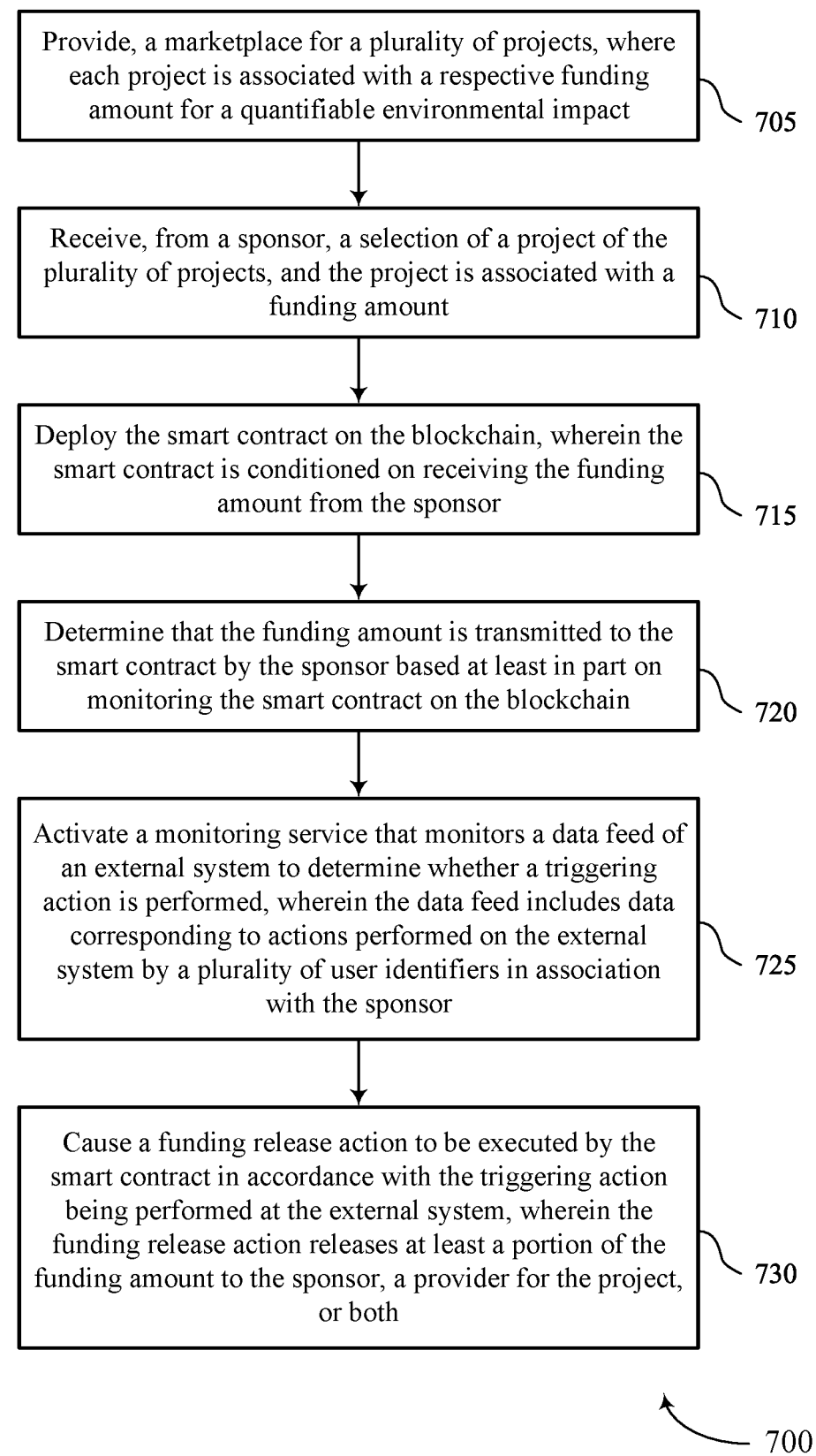
FIGS. 7 through 10 show flowcharts illustrating methods that support action tracking and deeds between multiple parties in accordance with aspects of the present disclosure.

FIG. 7 shows a flowchart illustrating a method 700 that supports action tracking and deeds between multiple parties in accordance with aspects of the present disclosure. The operations of the method 700 may be implemented by a server or its components as described herein. For example, the operations of the method 700 may be performed by a server as described with reference to FIG. 1 through 6. In some examples, a server may execute a set of instructions to control the functional elements of the server to perform the described functions. Additionally or alternatively, the server may perform aspects of the described functions using special-purpose hardware.

At 705, the method may include providing, a marketplace for a plurality of projects, where each project is associated with a respective funding amount for a quantifiable environmental impact. The operations of 705 may be performed in accordance with examples as disclosed herein. In some examples, aspects of the operations of 705 may be performed by a marketplace component 525 as described with reference to FIG. 5.

At 710, the method may include receiving, from a sponsor, a selection of a project of the plurality of projects, and the project is associated with a funding amount. The operations of 710 may be performed in accordance with examples as disclosed herein. In some examples, aspects of the operations of 710 may be performed by a project selection interface 530 as described with reference to FIG. 5.

At 715, the method may include deploying the smart contract on the blockchain, wherein the smart contract is conditioned on receiving the funding amount from the sponsor. The operations of 715 may be performed in accordance with examples as disclosed herein. In some examples, aspects of the operations of 715 may be performed by a smart contract deployment component 535 as described with reference to FIG. 5.

At 720, the method may include determining that the funding amount is transmitted to the smart contract by the sponsor based at least in part on monitoring the smart contract on the blockchain. The operations of 720 may be performed in accordance with examples as disclosed herein. In some examples, aspects of the operations of 720 may be performed by a condition tracking component 540 as described with reference to FIG. 5.

At 725, the method may include activating a monitoring service that monitors a data feed of an external system to determine whether a triggering action is performed, wherein the data feed includes data corresponding to actions performed on the external system by a plurality of user identifiers in association with the sponsor. The operations of 725 may be performed in accordance with examples as disclosed herein. In some examples, aspects of the operations of 725 may be performed by an activity monitoring component 545 as described with reference to FIG. 5.

At 730, the method may include causing a funding release action to be executed by the smart contract in accordance with the triggering action being performed at the external system, wherein the funding release action releases at least a portion of the funding amount to the sponsor, a provider for the project, or both. The operations of 730 may be performed in accordance with examples as disclosed herein. In some examples, aspects of the operations of 730 may be performed by a contract execution component 550 as described with reference to FIG. 5.

Figure 8:
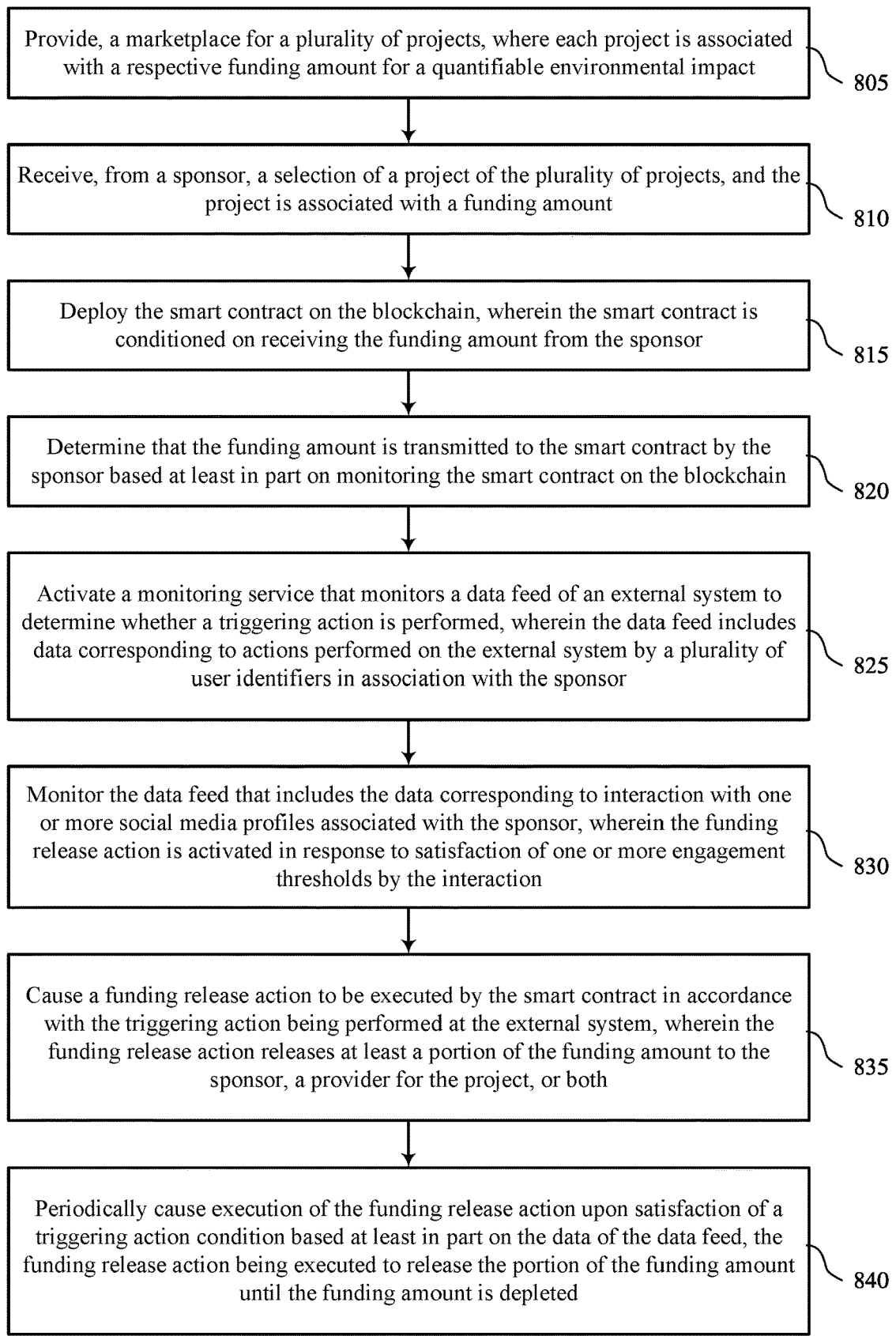

FIG. 8 shows a flowchart illustrating a method 800 that supports action tracking and deeds between multiple parties in accordance with aspects of the present disclosure. The operations of the method 800 may be implemented by a server or its components as described herein. For example, the operations of the method 800 may be performed by a server as described with reference to FIG. 1 through 6. In some examples, a server may execute a set of instructions to control the functional elements of the server to perform the described functions. Additionally or alternatively, the server may perform aspects of the described functions using special-purpose hardware.

At 805, the method may include providing, a marketplace for a plurality of projects, where each project is associated with a respective funding amount for a quantifiable environmental impact. The operations of 805 may be performed in accordance with examples as disclosed herein. In some examples, aspects of the operations of 805 may be performed by a marketplace component 525 as described with reference to FIG. 5.

At 810, the method may include receiving, from a sponsor, a selection of a project of the plurality of projects, and the project is associated with a funding amount. The operations of 810 may be performed in accordance with examples as disclosed herein. In some examples, aspects of the operations of 810 may be performed by a project selection interface 530 as described with reference to FIG. 5.

At 815, the method may include deploying the smart contract on the blockchain, wherein the smart contract is conditioned on receiving the funding amount from the sponsor. The operations of 815 may be performed in accordance with examples as disclosed herein. In some examples, aspects of the operations of 815 may be performed by a smart contract deployment component 535 as described with reference to FIG. 5.

At 820, the method may include determining that the funding amount is transmitted to the smart contract by the sponsor based at least in part on monitoring the smart contract on the blockchain. The operations of 820 may be performed in accordance with examples as disclosed herein. In some examples, aspects of the operations of 820 may be performed by a condition tracking component 540 as described with reference to FIG. 5.

At 825, the method may include activating a monitoring service that monitors a data feed of an external system to determine whether a triggering action is performed, wherein the data feed includes data corresponding to actions performed on the external system by a plurality of user identifiers in association with the sponsor. The operations of 825 may be performed in accordance with examples as disclosed herein. In some examples, aspects of the operations of 825 may be performed by an activity monitoring component 545 as described with reference to FIG. 5.

At 830, the method may include monitoring the data feed that includes the data corresponding to interaction with one or more social media profiles associated with the sponsor, wherein the funding release action is activated in response to satisfaction of one or more engagement thresholds by the interaction. The operations of 830 may be performed in accordance with examples as disclosed herein. In some examples, aspects of the operations of 830 may be performed by an activity monitoring component 545 as described with reference to FIG. 5.

At 835, the method may include causing a funding release action to be executed by the smart contract in accordance with the triggering action being performed at the external system, wherein the funding release action releases at least a portion of the funding amount to the sponsor, a provider for the project, or both. The operations of 835 may be performed in accordance with examples as disclosed herein. In some examples, aspects of the operations of 835 may be performed by a contract execution component 550 as described with reference to FIG. 5.

At 840, the method may include periodically causing execution of the funding release action upon satisfaction of a triggering action condition based at least in part on the data of the data feed, the funding release action being executed to release the portion of the funding amount until the funding amount is depleted. The operations of 840 may be performed in accordance with examples as disclosed herein. In some examples, aspects of the operations of 840 may be performed by a contract execution component 550 as described with reference to FIG. 5.

Figure 9:
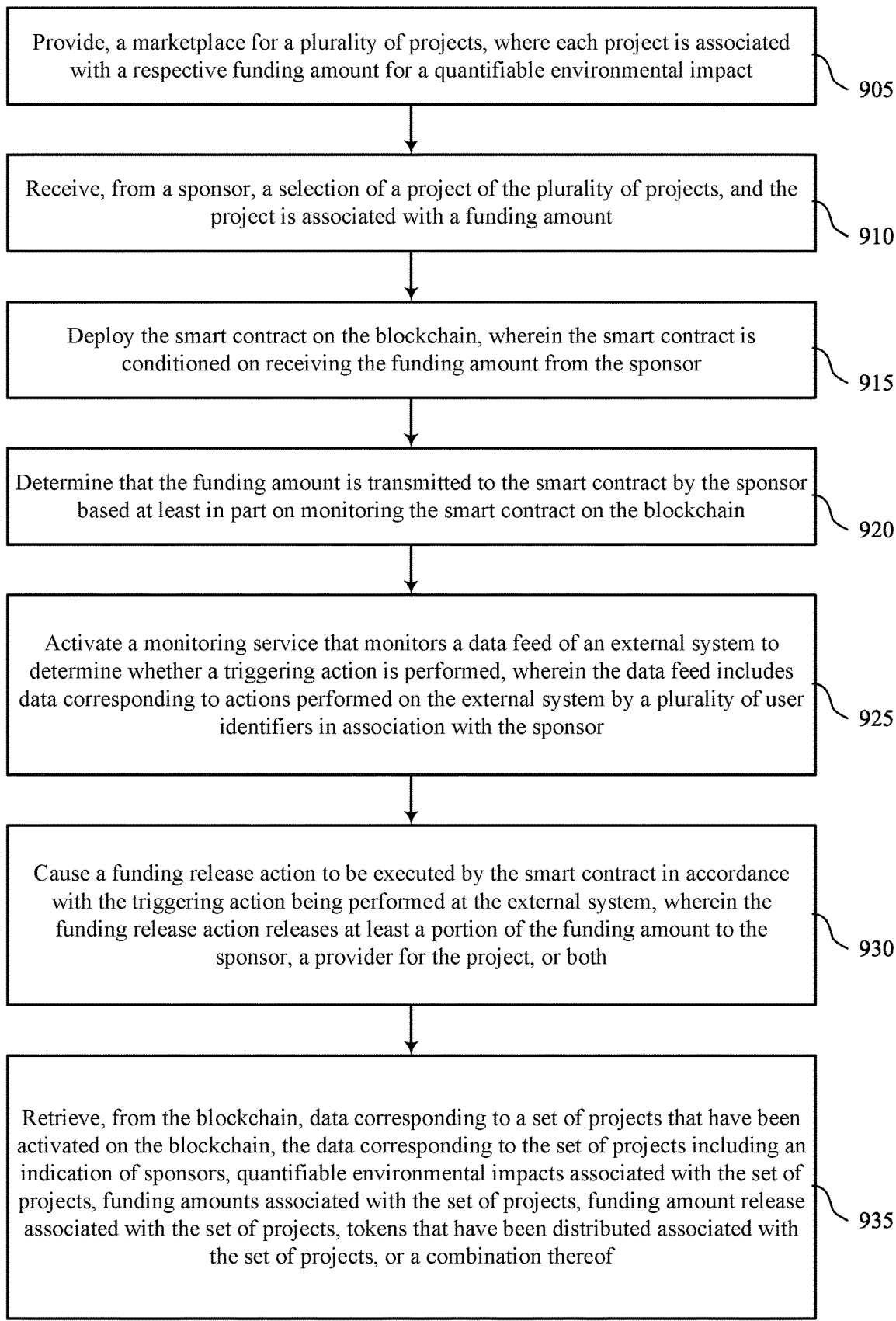

FIG. 9 shows a flowchart illustrating a method 900 that supports action tracking and deeds between multiple parties in accordance with aspects of the present disclosure. The operations of the method 900 may be implemented by a server or its components as described herein. For example, the operations of the method 900 may be performed by a server as described with reference to FIG. 1 through 6. In some examples, a server may execute a set of instructions to control the functional elements of the server to perform the described functions. Additionally or alternatively, the server may perform aspects of the described functions using special-purpose hardware.

At 905, the method may include providing, a marketplace for a plurality of projects, where each project is associated with a respective funding amount for a quantifiable environmental impact. The operations of 905 may be performed in accordance with examples as disclosed herein. In some examples, aspects of the operations of 905 may be performed by a marketplace component 525 as described with reference to FIG. 5.

At 910, the method may include receiving, from a sponsor, a selection of a project of the plurality of projects, and the project is associated with a funding amount. The operations of 910 may be performed in accordance with examples as disclosed herein. In some examples, aspects of the operations of 910 may be performed by a project selection interface 530 as described with reference to FIG. 5.

At 915, the method may include deploying the smart contract on the blockchain, wherein the smart contract is conditioned on receiving the funding amount from the sponsor. The operations of 915 may be performed in accordance with examples as disclosed herein. In some examples, aspects of the operations of 915 may be performed by a smart contract deployment component 535 as described with reference to FIG. 5.

At 920, the method may include determining that the funding amount is transmitted to the smart contract by the sponsor based at least in part on monitoring the smart contract on the blockchain. The operations of 920 may be performed in accordance with examples as disclosed herein. In some examples, aspects of the operations of 920 may be performed by a condition tracking component 540 as described with reference to FIG. 5.

At 925, the method may include activating a monitoring service that monitors a data feed of an external system to determine whether a triggering action is performed, wherein the data feed includes data corresponding to actions performed on the external system by a plurality of user identifiers in association with the sponsor. The operations of 925 may be performed in accordance with examples as disclosed herein. In some examples, aspects of the operations of 925 may be performed by an activity monitoring component 545 as described with reference to FIG. 5.

At 930, the method may include causing a funding release action to be executed by the smart contract in accordance with the triggering action being performed at the external system, wherein the funding release action releases at least a portion of the funding amount to the sponsor, a provider for the project, or both. The operations of 930 may be performed in accordance with examples as disclosed herein. In some examples, aspects of the operations of 930 may be performed by a contract execution component 550 as described with reference to FIG. 5.

At 935, the method may include retrieving, from the blockchain, data corresponding to a set of projects that have been activated on the blockchain, the data corresponding to the set of projects including an indication of sponsors, quantifiable environmental impacts associated with the set of projects, funding amounts associated with the set of projects, funding amount release associated with the set of projects, tokens that have been distributed associated with the set of projects, or a combination thereof. The operations of 935 may be performed in accordance with examples as disclosed herein. In some examples, aspects of the operations of 935 may be performed by a blockchain data component 555 as described with reference to FIG. 5.

Figure 10:
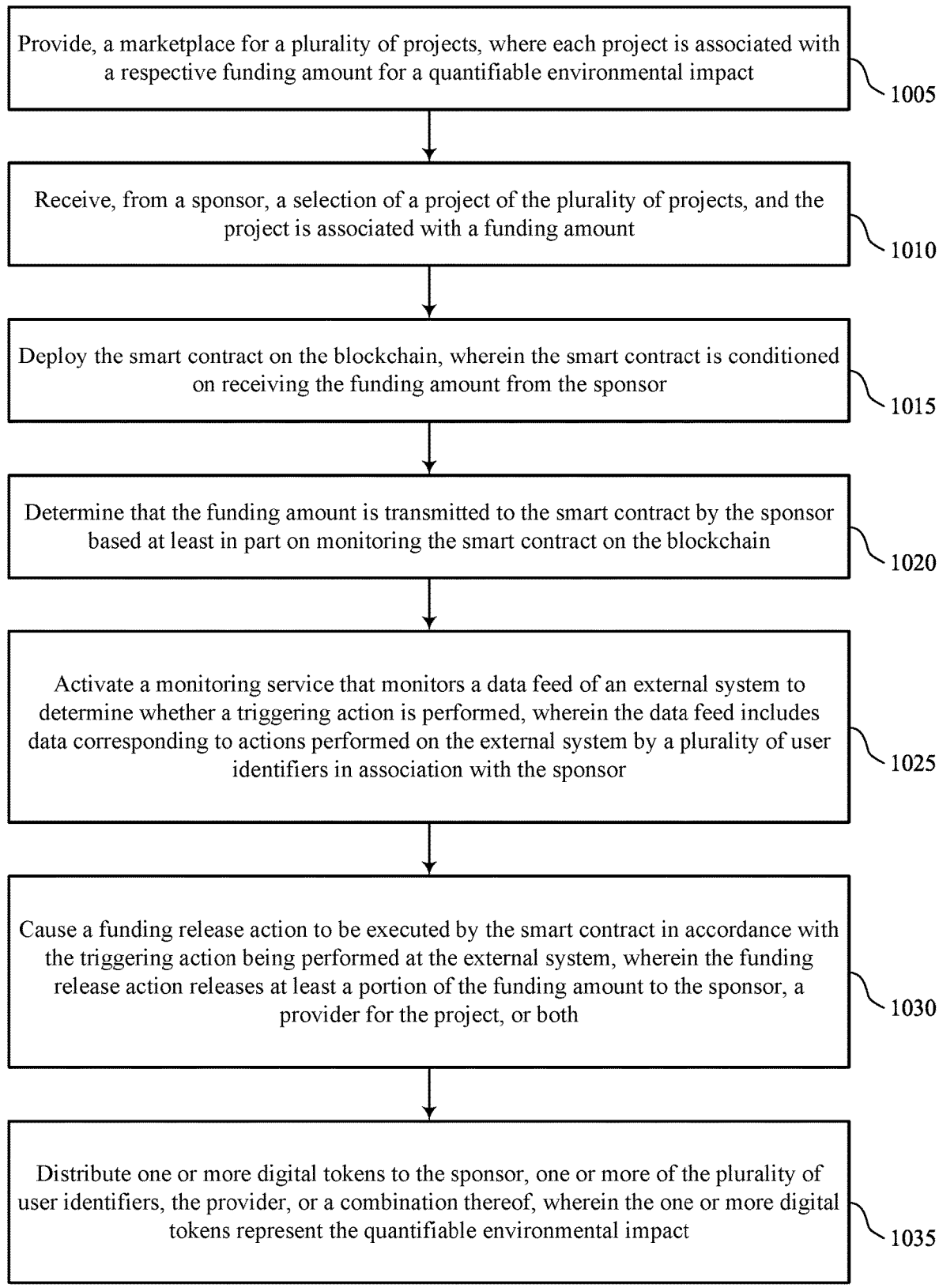

FIG. 10 shows a flowchart illustrating a method 1000 that supports action tracking and deeds between multiple parties in accordance with aspects of the present disclosure. The operations of the method 1000 may be implemented by a server or its components as described herein. For example, the operations of the method 1000 may be performed by a server as described with reference to FIG. 1 through 6. In some examples, a server may execute a set of instructions to control the functional elements of the server to perform the described functions. Additionally or alternatively, the server may perform aspects of the described functions using special-purpose hardware.

At 1005, the method may include providing, a marketplace for a plurality of projects, where each project is associated with a respective funding amount for a quantifiable environmental impact. The operations of 1005 may be performed in accordance with examples as disclosed herein. In some examples, aspects of the operations of 1005 may be performed by a marketplace component 525 as described with reference to FIG. 5.

At 1010, the method may include receiving, from a sponsor, a selection of a project of the plurality of projects, and the project is associated with a funding amount. The operations of 1010 may be performed in accordance with examples as disclosed herein. In some examples, aspects of the operations of 1010 may be performed by a project selection interface 530 as described with reference to FIG. 5.

At 1015, the method may include deploying the smart contract on the blockchain, wherein the smart contract is conditioned on receiving the funding amount from the sponsor. The operations of 1015 may be performed in accordance with examples as disclosed herein. In some examples, aspects of the operations of 1015 may be performed by a smart contract deployment component 535 as described with reference to FIG. 5.

At 1020, the method may include determining that the funding amount is transmitted to the smart contract by the sponsor based at least in part on monitoring the smart contract on the blockchain. The operations of 1020 may be performed in accordance with examples as disclosed herein. In some examples, aspects of the operations of 1020 may be performed by a condition tracking component 540 as described with reference to FIG. 5.

At 1025, the method may include activating a monitoring service that monitors a data feed of an external system to determine whether a triggering action is performed, wherein the data feed includes data corresponding to actions performed on the external system by a plurality of user identifiers in association with the sponsor. The operations of 1025 may be performed in accordance with examples as disclosed herein. In some examples, aspects of the operations of 1025 may be performed by an activity monitoring component 545 as described with reference to FIG. 5.

At 1030, the method may include causing a funding release action to be executed by the smart contract in accordance with the triggering action being performed at the external system, wherein the funding release action releases at least a portion of the funding amount to the sponsor, a provider for the project, or both. The operations of 1030 may be performed in accordance with examples as disclosed herein. In some examples, aspects of the operations of 1030 may be performed by a contract execution component 550 as described with reference to FIG. 5.

At 1035, the method may include distributing one or more digital tokens to the sponsor, one or more of the plurality of user identifiers, the provider, or a combination thereof, wherein the one or more digital tokens represent the quantifiable environmental impact. The operations of 1035 may be performed in accordance with examples as disclosed herein. In some examples, aspects of the operations of 1035 may be performed by a token distribution component 560 as described with reference to FIG. 5.

A method for activating and managing a smart contract on a blockchain is described. The method may include providing, a marketplace for a plurality of projects, where each project is associated with a respective funding amount for a quantifiable environmental impact, receiving, from a sponsor, a selection of a project of the plurality of projects, and the project is associated with a funding amount, deploying the smart contract on the blockchain, wherein the smart contract is conditioned on receiving the funding amount from the sponsor, determining that the funding amount is transmitted to the smart contract by the sponsor based at least in part on monitoring the smart contract on the blockchain, activating a monitoring service that monitors a data feed of an external system to determine whether a triggering action is performed, wherein the data feed includes data corresponding to actions performed on the external system by a plurality of user identifiers in association with the sponsor, and causing a funding release action to be executed by the smart contract in accordance with the triggering action being performed at the external system, wherein the funding release action releases at least a portion of the funding amount to the sponsor, a provider for the project, or both.

An apparatus for activating and managing a smart contract on a blockchain is described. The apparatus may include a processor, memory coupled with the processor, and instructions stored in the memory. The instructions may be executable by the processor to cause the apparatus to provide, a marketplace for a plurality of projects, where each project is associated with a respective funding amount for a quantifiable environmental impact, receive, from a sponsor, a selection of a project of the plurality of projects, and the project is associated with a funding amount, deploy the smart contract on the blockchain, wherein the smart contract is conditioned on receiving the funding amount from the sponsor, determine that the funding amount is transmitted to the smart contract by the sponsor based at least in part on monitoring the smart contract on the blockchain, activate a monitoring service that monitors a data feed of an external system to determine whether a triggering action is performed, wherein the data feed includes data corresponding to actions performed on the external system by a plurality of user identifiers in association with the sponsor, and cause a funding release action to be executed by the smart contract in accordance with the triggering action being performed at the external system, wherein the funding release action releases at least a portion of the funding amount to the sponsor, a provider for the project, or both.

Another apparatus for activating and managing a smart contract on a blockchain is described. The apparatus may include means for providing, a marketplace for a plurality of projects, where each project is associated with a respective funding amount for a quantifiable environmental impact, means for receiving, from a sponsor, a selection of a project of the plurality of projects, and the project is associated with a funding amount, means for deploying the smart contract on the blockchain, wherein the smart contract is conditioned on receiving the funding amount from the sponsor, means for determining that the funding amount is transmitted to the smart contract by the sponsor based at least in part on monitoring the smart contract on the blockchain, means for activating a monitoring service that monitors a data feed of an external system to determine whether a triggering action is performed, wherein the data feed includes data corresponding to actions performed on the external system by a plurality of user identifiers in association with the sponsor, and means for causing a funding release action to be executed by the smart contract in accordance with the triggering action being performed at the external system, wherein the funding release action releases at least a portion of the funding amount to the sponsor, a provider for the project, or both.

A non-transitory computer-readable medium storing code for activating and managing a smart contract on a blockchain is described. The code may include instructions executable by a processor to provide, a marketplace for a plurality of projects, where each project is associated with a respective funding amount for a quantifiable environmental impact, receive, from a sponsor, a selection of a project of the plurality of projects, and the project is associated with a funding amount, deploy the smart contract on the blockchain, wherein the smart contract is conditioned on receiving the funding amount from the sponsor, determine that the funding amount is transmitted to the smart contract by the sponsor based at least in part on monitoring the smart contract on the blockchain, activate a monitoring service that monitors a data feed of an external system to determine whether a triggering action is performed, wherein the data feed includes data corresponding to actions performed on the external system by a plurality of user identifiers in association with the sponsor, and cause a funding release action to be executed by the smart contract in accordance with the triggering action being performed at the external system, wherein the funding release action releases at least a portion of the funding amount to the sponsor, a provider for the project, or both.

In some examples of the method, apparatuses, and non-transitory computer-readable medium described herein, the external system comprises a social media platform and the method, apparatuses, and non-transitory computer-readable medium may include further operations, features, means, or instructions for monitoring the data feed that includes the data corresponding to interaction with one or more social media profiles associated with the sponsor, wherein the funding release action may be activated in response to satisfaction of one or more engagement thresholds by the interaction.

In some examples of the method, apparatuses, and non-transitory computer-readable medium described herein, periodically causing execution of the funding release action upon satisfaction of a triggering action condition based at least in part on the data of the data feed, the funding release action being executed to release the portion of the funding amount until the funding amount may be depleted.

Some examples of the method, apparatuses, and non-transitory computer-readable medium described herein may further include operations, features, means, or instructions for retrieving, from the blockchain, data corresponding to a set of projects that may have been activated on the blockchain, the data corresponding to the set of projects including an indication of sponsors, quantifiable environmental impacts associated with the set of projects, funding amounts associated with the set of projects, funding amount release associated with the set of projects, tokens that may have been distributed associated with the set of projects, or a combination thereof.

Some examples of the method, apparatuses, and non-transitory computer-readable medium described herein may further include operations, features, means, or instructions for causing display at a user interface or at a social media platform, one or more metrics associated with the retrieved data.

In some examples of the method, apparatuses, and non-transitory computer-readable medium described herein, the sponsor may be associated with a public key, and determine that the funding amount may be transmitted may include operations, features, means, or instructions for determining that an account associated with the public key may have transmitted the funding amount to the smart contract based at least in part on monitoring the public key on the blockchain.

Some examples of the method, apparatuses, and non-transitory computer-readable medium described herein may further include operations, features, means, or instructions for distributing one or more digital tokens to the sponsor, one or more of the plurality of user identifiers, the provider, or a combination thereof, wherein the one or more digital tokens represent the quantifiable environmental impact.

In some examples of the method, apparatuses, and non-transitory computer-readable medium described herein, distributing the one or more digital tokens may include operations, features, means, or instructions for causing execution, by the smart contract, a digital token release action to distribute the one or more digital tokens.

Some examples of the method, apparatuses, and non-transitory computer-readable medium described herein may further include operations, features, means, or instructions for assigning a unique identifier to the project, assigning the unique identifier to the smart contract, and activating the monitoring service in association with the unique identifier, wherein the unique identifier may be used to monitor the actions performed on the external system and cause the funding release action to be executed.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for activating and managing a smart contract on a blockchain, comprising:

providing, a marketplace for a plurality of projects, wherein each project is associated with a respective funding amount for a quantifiable environmental impact;

receiving, from a sponsor, a selection of a project of the plurality of projects, and the project is associated with a funding amount;

deploying the smart contract on the blockchain, wherein the smart contract is conditioned on receiving the funding amount from the sponsor;

determining that the funding amount is transmitted to the smart contract by the sponsor based at least in part on monitoring the smart contract on the blockchain;

activating a monitoring service that monitors a data feed of an external system to determine whether a triggering action is performed, wherein the data feed includes data corresponding to actions performed on the external system by a plurality of user identifiers in association with the sponsor; and causing a funding release action to be executed by the smart contract in accordance with the triggering action being performed at the external system, wherein the funding release action releases at least a portion of the funding amount to the sponsor, a provider for the project, or both.

2. The method of claim 1, wherein the external system comprises a social media platform, the method further comprising:

monitoring the data feed that includes the data corresponding to interaction with one or more social media profiles associated with the sponsor, wherein the funding release action is activated in response to satisfaction of one or more engagement thresholds by the interaction.

3. The method of claim 1, further comprising:

periodically causing execution of the funding release action upon satisfaction of a triggering action condition based at least in part on the data of the data feed, the funding release action being executed to release the portion of the funding amount until the funding amount is depleted.

4. The method of claim 1, further comprising:

retrieving, from the blockchain, data corresponding to a set of projects that have been activated on the blockchain, the data corresponding to the set of projects including an indication of sponsors, quantifiable environmental impacts associated with the set of projects, funding amounts associated with the set of projects, funding amount release associated with the set of projects, tokens that have been distributed associated with the set of projects, or a combination thereof.

5. The method of claim 4, further comprising:

causing display at a user interface or at a social media platform, one or more metrics associated with the retrieved data.

6. The method of claim 1, wherein the sponsor is associated with a public key and determine that the funding amount is transmitted comprises:

determining that an account associated with the public key has transmitted the funding amount to the smart contract based at least in part on monitoring the public key on the blockchain.

7. The method of claim 1, further comprising:

distributing one or more digital tokens to the sponsor, one or more of the plurality of user identifiers, the provider, or a combination thereof, wherein the one or more digital tokens represent the quantifiable environmental impact.

8. The method of claim 7, wherein distributing the one or more digital tokens comprises:

causing execution, by the smart contract, a digital token release action to distribute the one or more digital tokens.

9. The method of claim 1, further comprising:

assigning a unique identifier to the project;

assigning the unique identifier to the smart contract; and activating the monitoring service in association with the unique identifier, wherein the unique identifier is used to monitor the actions performed on the external system and cause the funding release action to be executed.

10. An apparatus for activating and managing a smart contract on a blockchain, comprising:

a processor;

memory coupled with the processor; and instructions stored in the memory and executable by the processor to cause the apparatus to:

provide, a marketplace for a plurality of projects, where each project is associated with a respective funding amount for a quantifiable environmental impact;

receive, from a sponsor, a selection of a project of the plurality of projects, and the project is associated with a funding amount;

deploy the smart contract on the blockchain, wherein the smart contract is conditioned on receiving the funding amount from the sponsor;

determine that the funding amount is transmitted to the smart contract by the sponsor based at least in part on monitoring the smart contract on the blockchain;

activate a monitoring service that monitors a data feed of an external system to determine whether a triggering action is performed, wherein the data feed includes data corresponding to actions performed on the external system by a plurality of user identifiers in association with the sponsor; and cause a funding release action to be executed by the smart contract in accordance with the triggering action being performed at the external system, wherein the funding release action releases at least a portion of the funding amount to the sponsor, a provider for the project, or both.

11. The apparatus of claim 10, wherein the external system comprises a social media platform, and the instructions are further executable by the processor to cause the apparatus to:

monitor the data feed that includes the data corresponding to interaction with one or more social media profiles associated with the sponsor, wherein the funding release action is activated in response to satisfaction of one or more engagement thresholds by the interaction.

12. The apparatus of claim 10, wherein the instructions are further executable by the processor to cause the apparatus to:

periodically cause execution of the funding release action upon satisfaction of a triggering action condition based at least in part on the data of the data feed, the funding release action being executed to release the portion of the funding amount until the funding amount is depleted.

13. The apparatus of claim 10, wherein the instructions are further executable by the processor to cause the apparatus to:

retrieve, from the blockchain, data corresponding to a set of projects that have been activated on the blockchain, the data corresponding to the set of projects including an indication of sponsors, quantifiable environmental impacts associated with the set of projects, funding amounts associated with the set of projects, funding amount release associated with the set of projects, tokens that have been distributed associated with the set of projects, or a combination thereof.

14. The apparatus of claim 13, wherein the instructions are further executable by the processor to cause the apparatus to:

cause display at a user interface or at a social media platform, one or more metrics associated with the retrieved data.

15. The apparatus of claim 10, wherein the sponsor is associated with a public key and the instructions to determine that the funding amount is transmitted are executable by the processor to cause the apparatus to:

determine that an account associated with the public key has transmitted the funding amount to the smart contract based at least in part on monitoring the public key on the blockchain.

16. A non-transitory computer-readable medium storing code for activating and managing a smart contract on a blockchain, the code comprising instructions executable by a processor to:

provide, a marketplace for a plurality of projects, where each project is associated with a respective funding amount for a quantifiable environmental impact;

receive, from a sponsor, a selection of a project of the plurality of projects, and the project is associated with a funding amount;

deploy the smart contract on the blockchain, wherein the smart contract is conditioned on receiving the funding amount from the sponsor;

determine that the funding amount is transmitted to the smart contract by the sponsor based at least in part on monitoring the smart contract on the blockchain;

activate a monitoring service that monitors a data feed of an external system to determine whether a triggering action is performed, wherein the data feed includes data corresponding to actions performed on the external system by a plurality of user identifiers in association with the sponsor; and cause a funding release action to be executed by the smart contract in accordance with the triggering action being performed at the external system, wherein the funding release action releases at least a portion of the funding amount to the sponsor, a provider for the project, or both.

17. The non-transitory computer-readable medium of claim 16, wherein the external system comprises a social media platform, and the instructions are further executable by the processor to:

monitor the data feed that includes the data corresponding to interaction with one or more social media profiles associated with the sponsor, wherein the funding release action is activated in response to satisfaction of one or more engagement thresholds by the interaction.

18. The non-transitory computer-readable medium of claim 16, wherein the instructions are further executable by the processor to:

periodically cause execution of the funding release action upon satisfaction of a triggering action condition based at least in part on the data of the data feed, the funding release action being executed to release the portion of the funding amount until the funding amount is depleted.

19. The non-transitory computer-readable medium of claim 16, wherein the instructions are further executable by the processor to:

retrieve, from the blockchain, data corresponding to a set of projects that have been activated on the blockchain, the data corresponding to the set of projects including an indication of sponsors, quantifiable environmental impacts associated with the set of projects, funding amounts associated with the set of projects, funding amount release associated with the set of projects, tokens that have been distributed associated with the set of projects, or a combination thereof.

20. The non-transitory computer-readable medium of claim 19, wherein the instructions are further executable by the processor to:

cause display at a user interface or at a social media platform, one or more metrics associated with the retrieved data.

* * * * *